Figure 1:
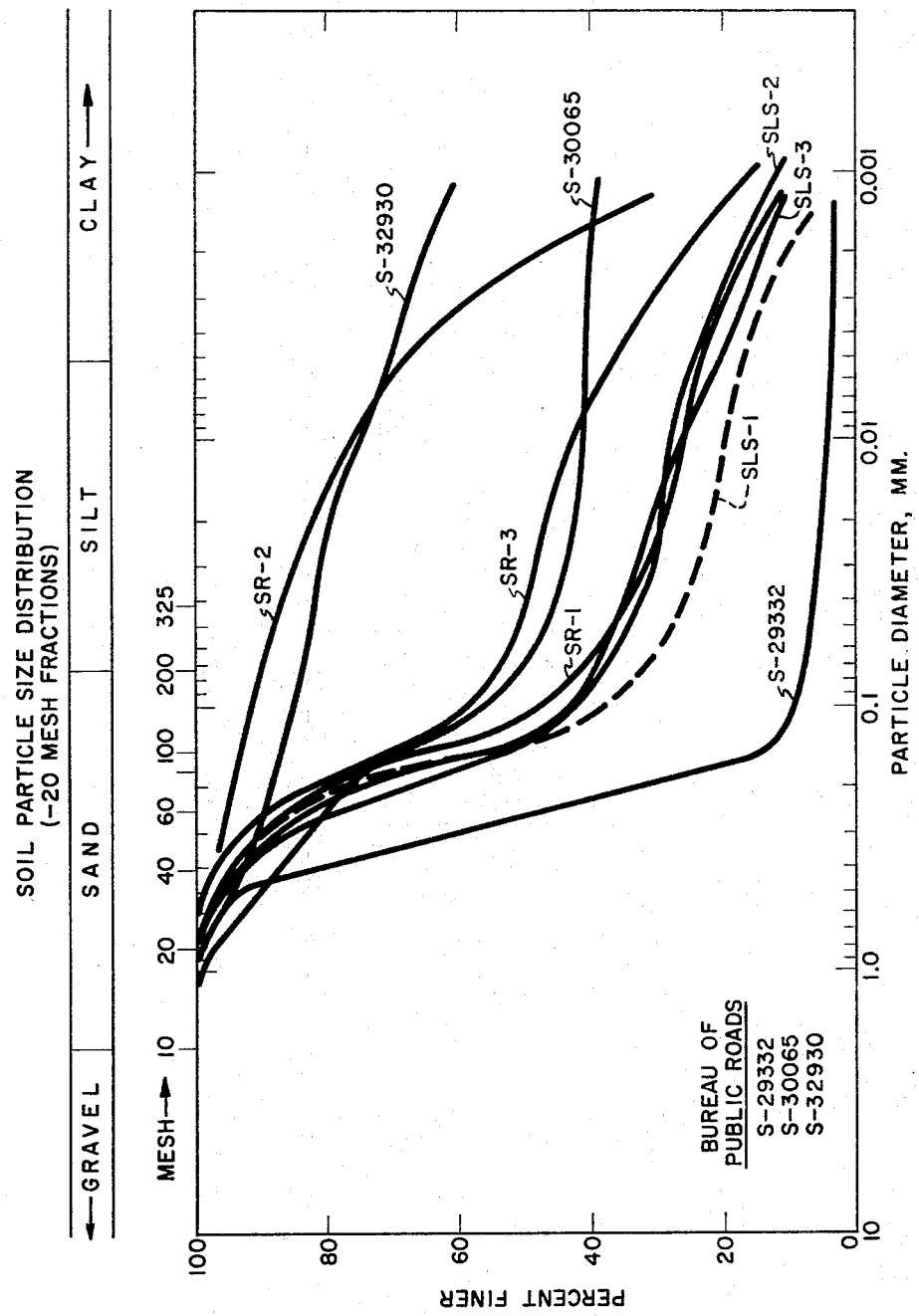

Nov. 22, 1966     D. T. ROGERS ETAL     3,287,146
PROCESS FOR PREPARING STRUCTURAL ELEMENT FROM SOIL AND BINDER
Filed Nov. 15, 1963     9 Sheets-Sheet 4

Dilworth T. Rogers
John C. Munday    INVENTORS

BY W. O. Heilman
Patent Attorney

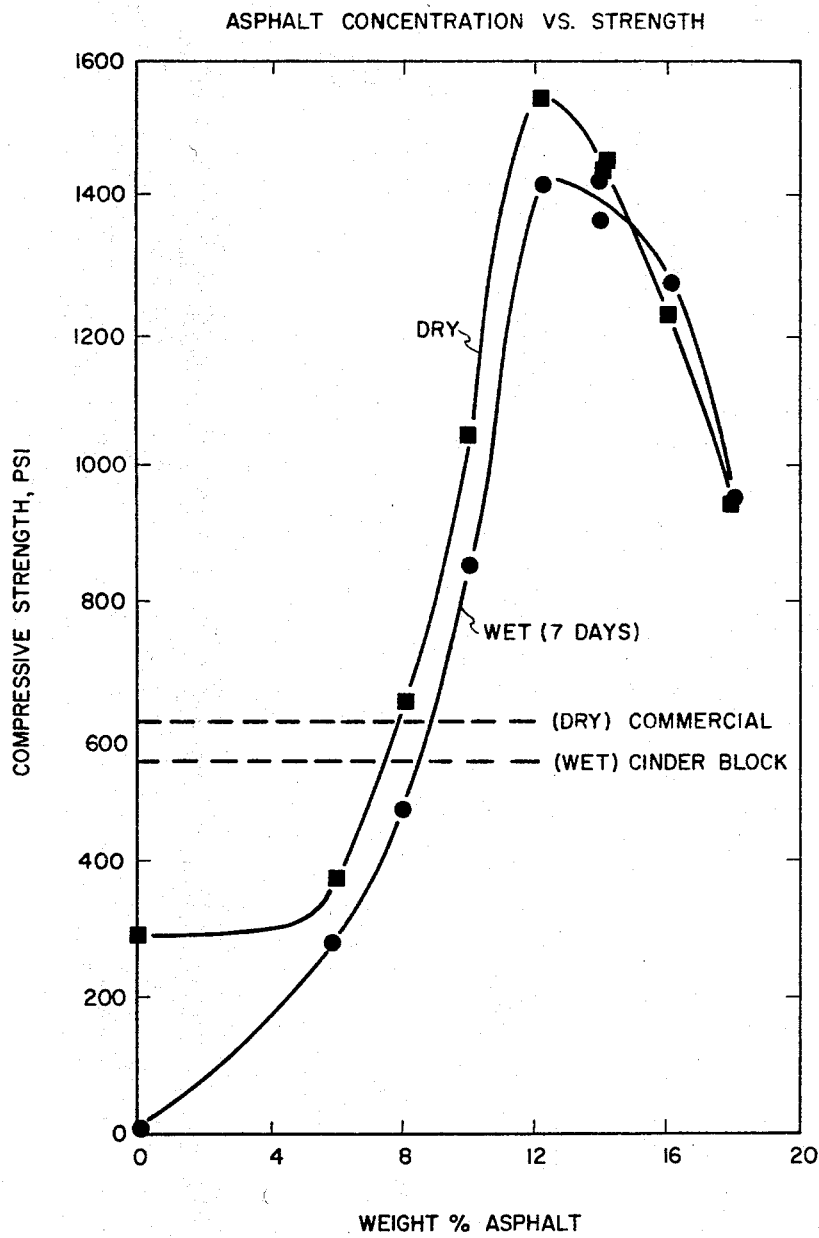

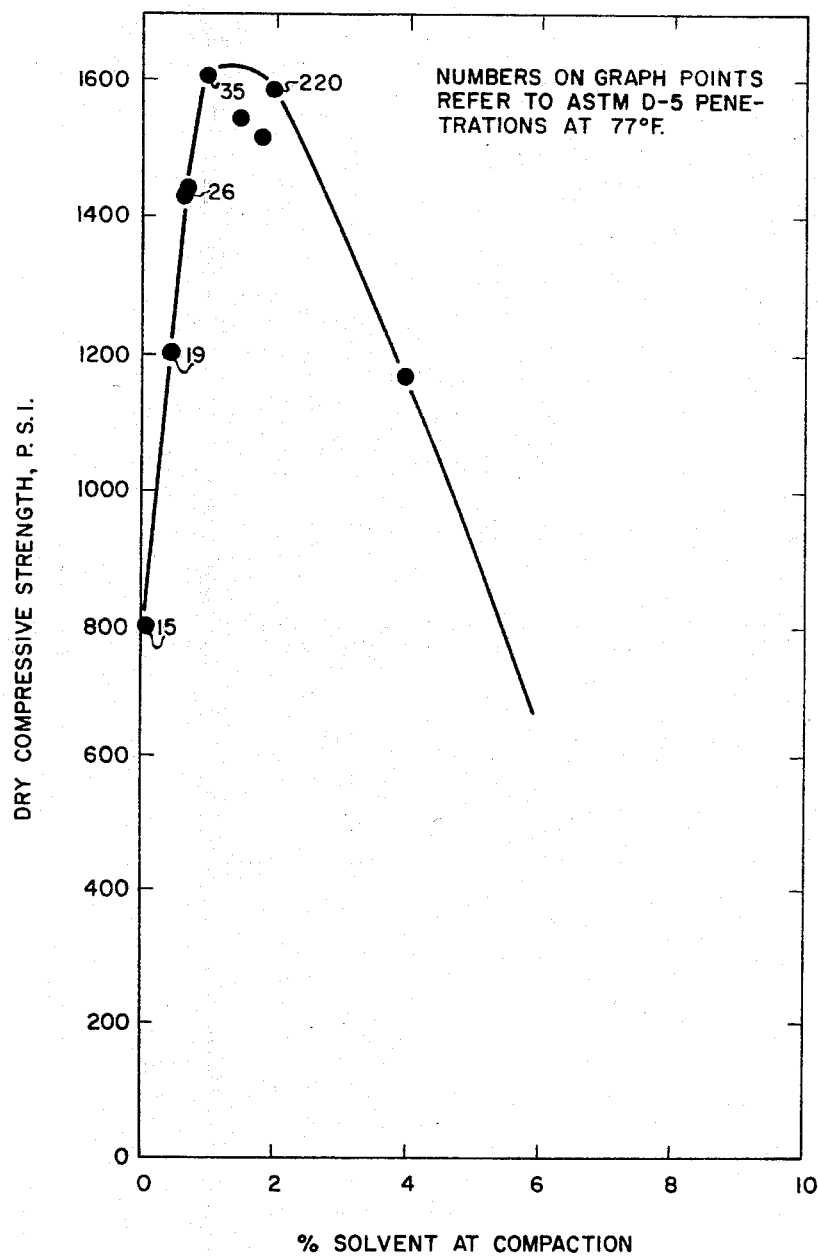

United States Patent Office 3,287,146
Patented Nov. 22, 1966

3,287,146
PROCESS FOR PREPARING STRUCTURAL ELEMENT FROM SOIL AND BINDER
Dilworth T. Rogers, Summit, and John C. Munday, Cranford, N.J., assignors to Esso Research and Engineering Company, a corporation of Delaware
Filed Nov. 15, 1963, Ser. No. 324,075
7 Claims. (Cl. 106—281)

The present invention is a continuation-in-part of S.N. 178,038 filed March 7, 1962, and now abandoned and of S.N. 256,666 filed February 6, 1963, and now abandoned and of S.N. 305,373 filed August 29, 1963.

The present invention is concerned with solid compositions produced from finely divided aggregate and a binder such as petroleum residue; and with a process of manufacture of these compositions and with shaped articles of manufacture comprising these compositions. The invention is particularly concerned with improved asphalt-stabilized compositions of soil or finely divided aggregate so converted as to have enhanced dry and wet compressive strengths, superior tensile and flexural strength and low water absorption properties. In the process of the present invention, the binder, which is initially a fluid, semi-fluid or plastic, oil-soluble material, is converted into an oil-insoluble, infusible, carbonaceous bond. The solid compositions of the present invention are dense, rocklike compositions characterized by having superior creep-resistant properties, freeze-thaw resistant properties, fire resistant properties, solvent resistant properties and properties of impenetrability by water. The solid compositions of the present invention are also characterized by having uniform precision of dimensions, and by being non-porous and very smooth, these characteristics thus enhancing their value as materials of construction.

The stabilization of soil and other particulate solids by petroleum binders, particularly for use in construction, has not hitherto enjoyed commercial success. A very limited number of houses, in which sandy clay-type soils in conjunction with asphalt have been used to form building blocks, has been built in the United States. In making these blocks, asphalt was applied to the soil as a water emulsion of an asphalt cutback solution in a naphtha. The mixture was then hand-tamped generally in wooden molds, and the blocks sun-cured for several weeks. The asphalt functioned mainly as a waterproofing agent rather than as a binder, since the asphalt increased the wet strength of the soil but did not appreciably increase dry strength. In this process, it was considered essential to wet the soil with water before mixing it with the asphalt cutback or the asphalt emulsion. The water deflocculated the clay aggregate and served as a compaction lubricant.

It was found that building blocks produced by this prior art method and the composition thereof gave maximum unconfined wet compressive strengths at about 3 to 8 wt. percent asphalt, depending upon the type of soil used, but failed to approach the compressive and tensile strength of commercially available concrete blocks and brick. Despite their low unit strength, these materials were of some limited use in arid or semi-arid regions in the form of thick, solid blocks where economic factors favored their use in certain types of construction. These blocks were wholly unsuitable in other geographical regions where there was a significant variation in humidity or where these building materials would contact moisture. Thus, beside very low compressive and tensile strength necessitating the use of thick solid blocks for adequate strength, the prior art asphalt-stabilized soil compositions could not be used in home construction, even in solid block form, where there was water contact or a variation in the humidity of the air, without a subsequent exterior coating. Thus, these prior art materials could not be employed, for example, below grade or at footing levels. A further disadvantage of these prior art materials was the poor adhesion characteristics of exterior finishes such as paint, mortar, stucco and the like to the exterior surface of the blocks. The blocks apparently expanded and contracted in response to small changes in the humidity of the air, resulting in extensive cracking and peeling of exterior coatings.

There have now been discovered a stabilized composition composed of critical quantities of subdivided solids and petroleum residua and a process for stabilizing solids, which composition and process avoid many of the disadvantages of the prior art and provide, for example, asphalt-stabilized aggregate and soil compositions of enhanced dry and wet compressive strengths.

Figure 2:
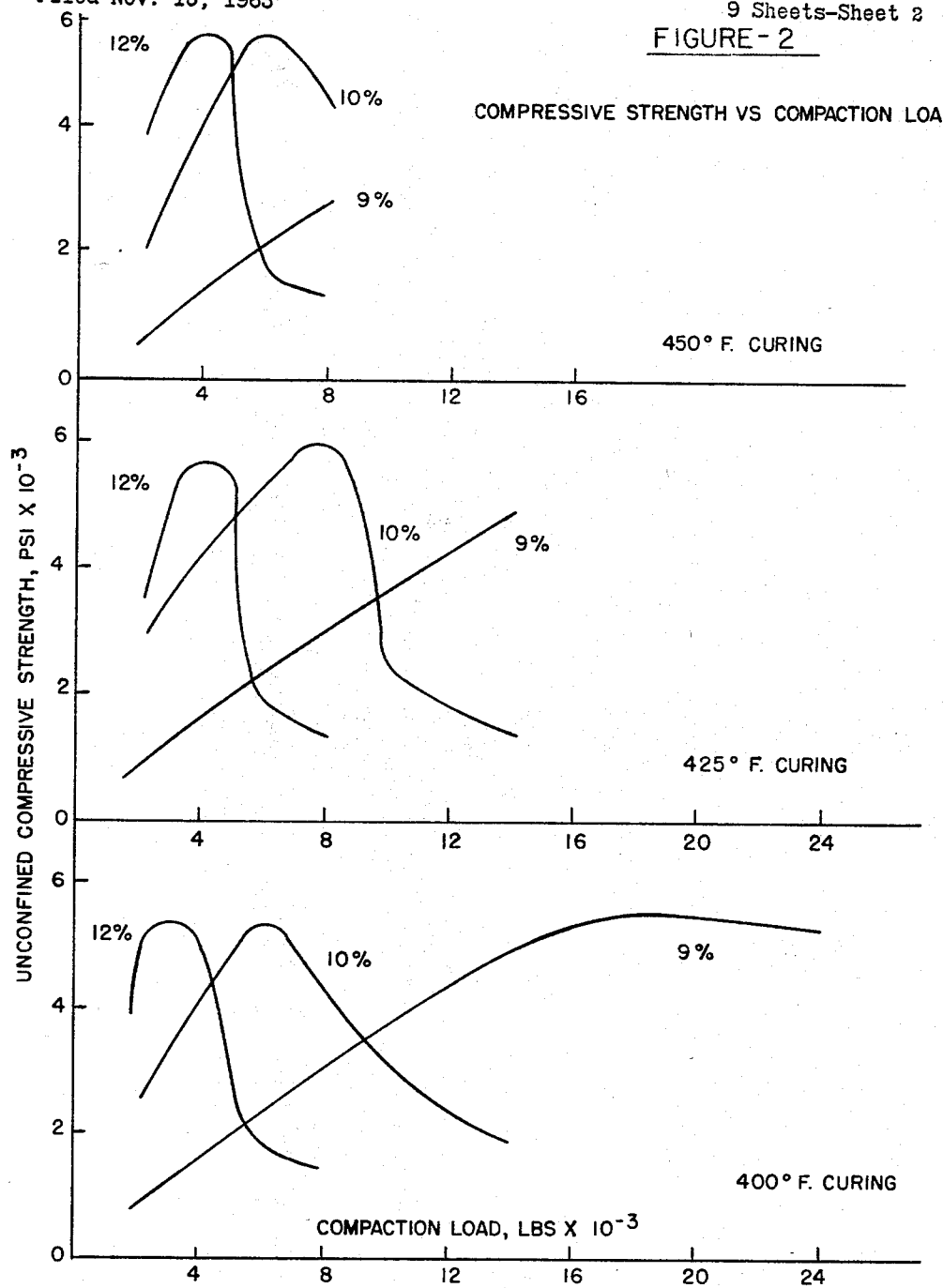
Figure 3:
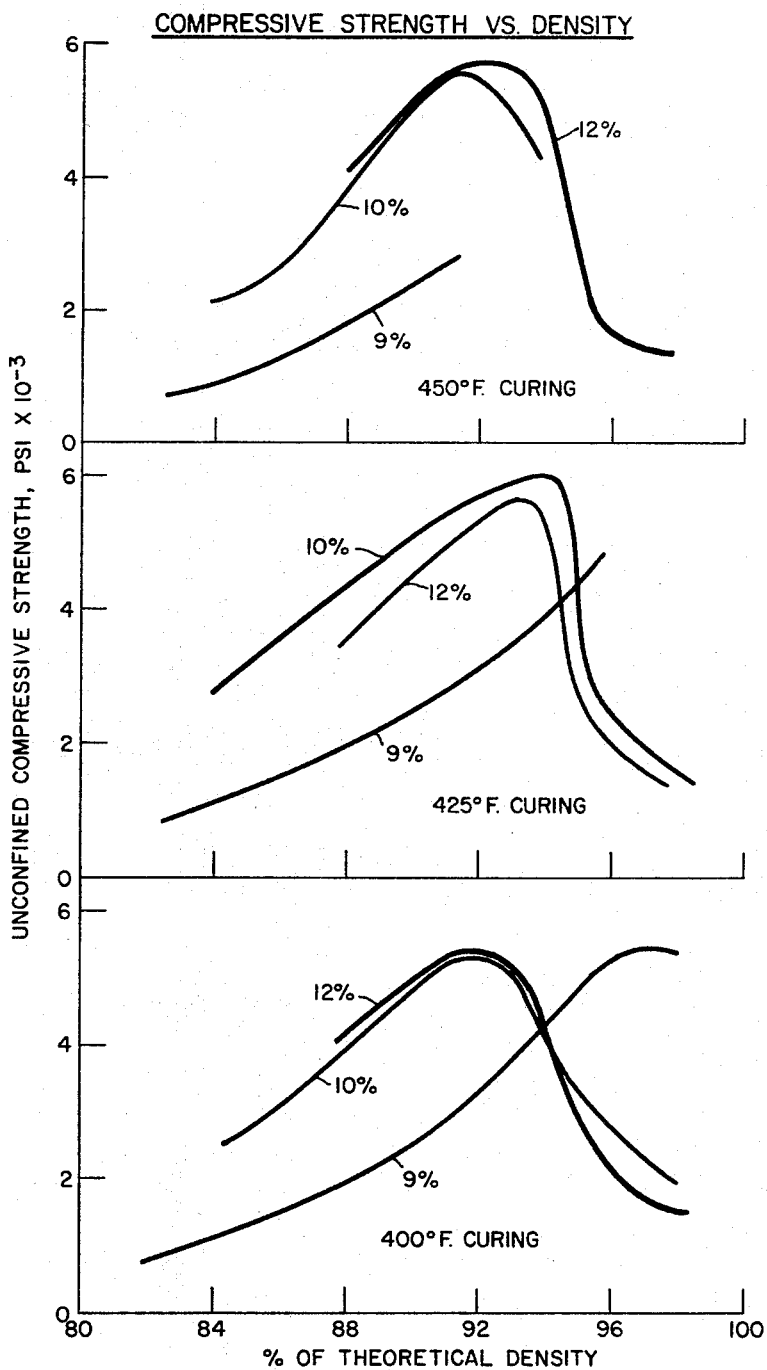
Figure 4:
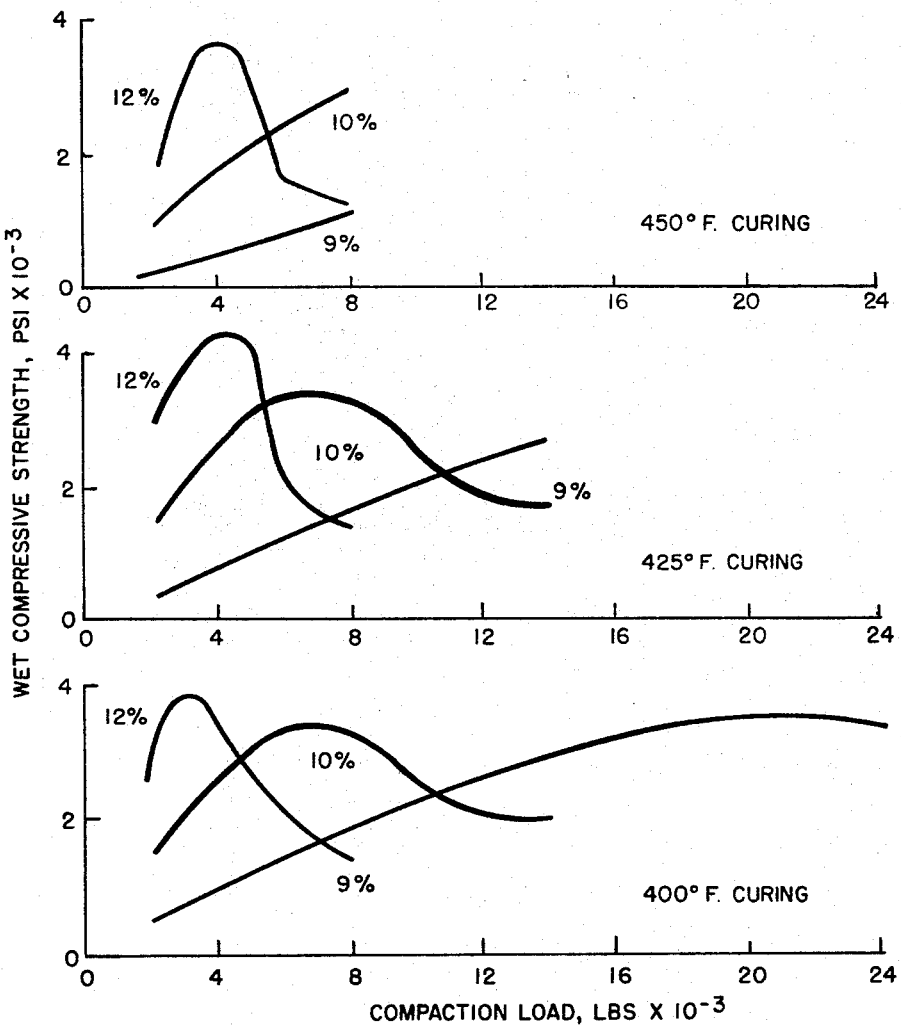
Figure 5:
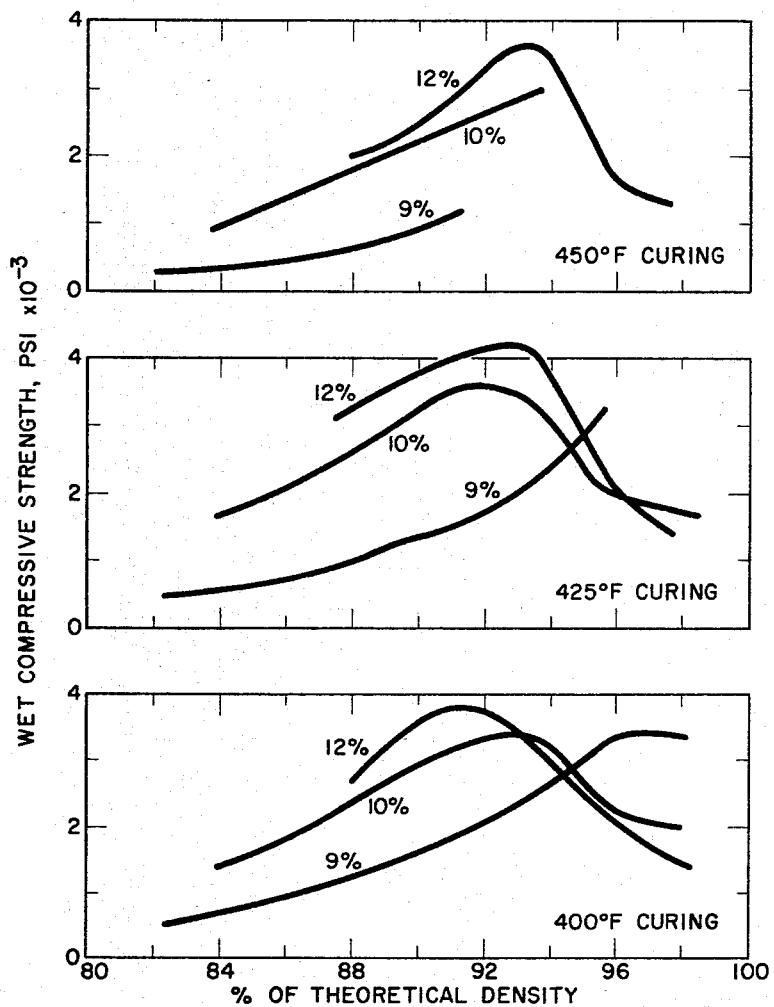
Figure 6:
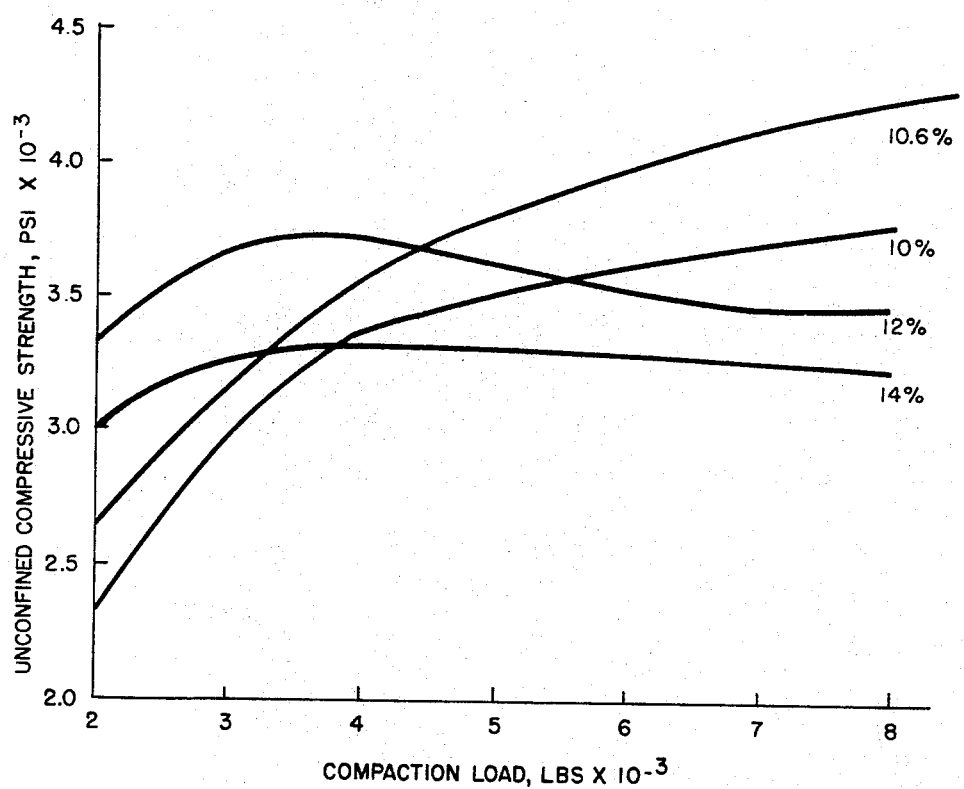
Figure 7:
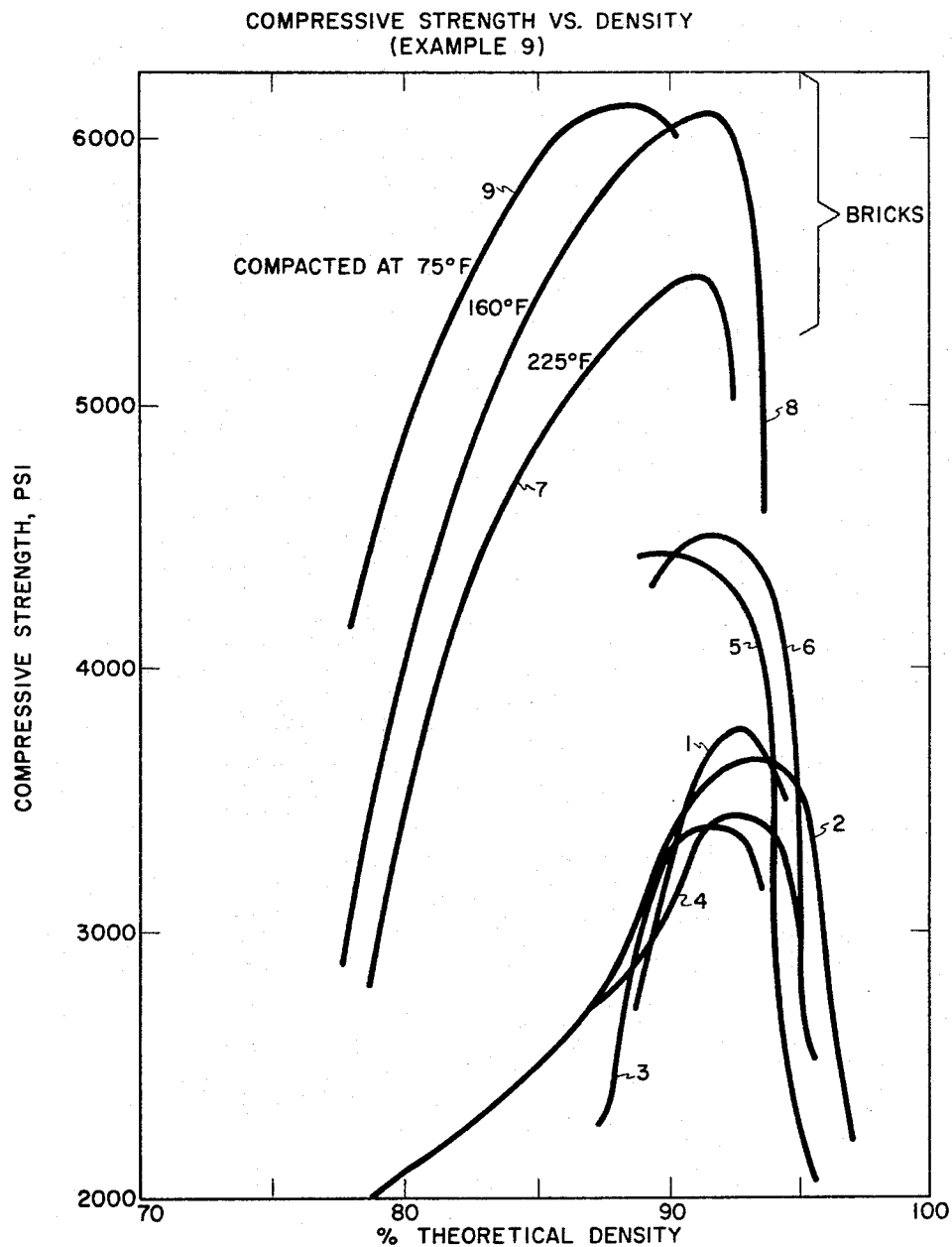

Various aspects of the present invention may be further illustrated by reference to the accompanying drawings. FIGURE 1 shows the particle size distribution of various soils which have been used in the present invention. FIGURE 2 shows the effects of compaction load upon compressive strength at various curing conditions and asphalt concentrations. FIGURE 3 shows the effects of theoretical density upon compressive strength at various curing conditions and asphalt concentrations. FIGURE 4 shows the effect of compaction load upon wet compressive strength at various curing conditions and asphalt concentrations. FIGURE 5 shows the effect of theoretical density upon wet compressive strength at various curing conditions and asphalt concentrations. FIGURE 6 shows the effect of compaction load upon unconfined compressive strength at various asphalt concentrations. FIGURE 7 shows the effect of theoretical density upon compressive strength at various compaction temperatures. FIGURE 8 shows the effect of asphalt concentrations on wet and dry compressive strengths. FIGURE 9 shows the effect of solvent concentration at time of compaction upon dry compressive strength. These figures are further described in the discussion that follows.

It has been found that if the soil to be stabilized is uniformly and thinly coated with a solvent cutback asphalt, maximum wet and dry compressive strengths are generally obtained at more than 8 wt. percent asphalt on a sandy clay soil. It has further been discovered, contrary to the prior art, that the presence of water as a compaction lubricant not only is not essential, but is actually detrimental to compressive strength. The employment of certain amounts in the range of 3 to 30 wt. percent of a cutback asphalt with soils containing no moisture or only small amounts of moisture allows solids to be compacted to high densities with both wet and dry compressive strengths exceeding the strength of commercially available nonmetallic building materias, while also allowing a wider range of soil types to be used. Additionally, these soils or other compacted finely divided solids or aggregates are substantially waterproof and do not significantly absorb water or tend to expand in the presence of moisture. Further, the stabilized soil compositions of the invention can be used in any climate or geographical area either above or below grade level and require only decorative finish. Ordinary house paints and other exterior coatings adhere well to the exterior surface and there is little or no tendency for the binder to bleed into the paint or exterior coating.

In accordance with another specific adaptation of the present invention, a critical quantity of asphalt is used in conjunction with soil of certain particle-size distribution and is compressed within a critical range of its theoretical 100% density. The compressed solid is then heat-treated under specific conditions to produce a high quality product suitable as a building material such as blocks, bricks, tile, board, pipe and the like.

Thus, in accordance with the present invention, 3 to 30 wt. percent, preferably 8 to 30 wt. percent of a bituminous binder such as asphalt is mixed with a subdivided solid or finely divided aggregate. The mixture is then compressed to a density of about 70 to 98%, preferably to a density of about 80 to 98% and more preferably 80 to 95%, based upon the theoretical density. The compressed product is then heat cured at a temperature in the range from 250 to 550° F., preferably from 300 to 500° F., for a period of time from about 1 hour to 10 days, preferably from about 4 hours to 80 hours and most preferably from 8 hours to 24 hours.

The preferred binder employed in the present invention comprises that family of materials commonly referred to as asphalts, such as natural or petroleum residua of thermoplastic solid or semi-solid consistency at ambient temperatures, normally of brown to black cementitious material in which the predominating constituents are bitumens. The bituminous material to be used may be selected from a wide variety of natural and industrial products. For instance, various natural asphalts may be used such as natural Trinidad, gilsonite, Grahamite and Cuban asphalts. Petroleum asphalts suitable for the purposes of this invention include those asphalts obtained from California crude, from tar sands, Venezuelan or Mexican petroleum asphalt, or Middle East or a Midcontinent airblown oil and the like, or combinations thereof. Petroleum asphalts also include those asphalts derived from hydrocarbon feed stocks such as bitumen, asphaltic residua obtained in a petroleum refining process such as those obtained by the vacuum distillation of petroleum hydrocarbon crude oils, the solvent deasphalting of crude residuum fractions, tarry products from the chemical refining such as oxidation of high molecular weight hydrocarbons, those asphalts obtained from hydrogenated coal products, the asphaltic material obtained in the thermal or catalytic cracking of petroleum to obtain gasoline or other light fractions or any combination of these materials.

Petroleum asphalts are generally prepared from petroleum residual oils obtained by the distillation of an asphaltic or semi-asphaltic crude oil or thermal tar or by the fluxing of harder residual asphalts with heavy petroleum distillates. Such residual oils are high boiling liquids or semi-solids which may have softening point from about 32° F. to about 120° F. and are generally characterized by specific gravities ranging from about 0.85 to about 1.07 at 77° F. Other properties of such residual oils, normally termed asphalt bases or asphalt fluxes, may vary to a considerable extent depending upon the particular crude oil from which they are derived.

Asphalts prepared from residual oils such as those set forth above may be classified as either straight reduced asphalts or as oxidized asphalts. Straight reduced asphalts are produced by the steam distillation, vacuum distillation, blending or solvent deasphalting or residual oils. These operations remove a significant quantity of the lower boiling, more volatile material present in the residual oils and result in a product having a softening point between about 100° and about 170° F., although higher softening points can be obtained by more extensive treatment.

Oxidized asphalts are produced by contacting a residual oil with air or a similar oxidizing agent, alone or in the presence of an oxidizing catalyst such as ferric chloride, phosphorus pentoxide or the like. The oxidation process serves to dehydrogenate certain constiuents of the asphalt, leading to the evolution of water and some carbon dioxide. Oily constituents are thus converted into resins and resins are converted into asphaltenes. Very little oil is removed during the oxidation operation. The penetration and ductility properties of oxidized asphalts are generally somewhat higher for a given softening point than are those of the straight reduced products. Both straight reduced asphalts and oxidized asphalts are useful in the invention.

Although the petroleum asphalts are preferred, other suitable bituminous material would include coal tar, wood tar, and pitches from various industrial processes. The invention can also be successfully practiced with chemically modified asphalts such as halogenated, e.g. chlorinated or sulfurized or phosphosulfurized asphalts, as well as asphalts treated with epoxides or haloepoxides like ethylene oxide and epichlorohydrin, or with silane halides, nitrobenzene, chlorinated aliphatics such as carbon tetrachloride and halohydrocarbons such as methylene chloride and the like. Additionally, the asphalts can be mixed with minor amounts, e.g. 1 to 10 wt. percent, of other natural and synthetic thermoplastics and thermosetting materials like rubers, resins, polymers and elastomers, of an oily, resinous or rubbery nature. Nonlimiting examples of suitable materials include polyolefins, polypropylene, polyethylene, polyisobutylene, polymers from steam-craked naphthas and the like; natural or synthetic rubber-like butyl rubber, halogenated butyl rubber, polydienes like polybutadiene, elastomeric copolymers of styrene and butadiene, copolymers of ethylene and propylene and the like; epoxy resins; polyalkylene oxides; natural and synthetic waxes; polyvinyl acetates; phenol aldehyde condensation products; and the like and combinations thereof.

Furthermore, in a modification wherein the asphalt is chemically modified by reaction with liquid reagents, for example $CCl_4$, the reagent liquid can often be used as the asphalt solvent, whereupon the desired reaction occurs before, during or after the compaction of the soil-asphalt cutback mixture, or during or after the curing step, or the reaction may occur continuously during both finishing process steps.

Satisfactory asphalts, for example, are those designated in the trade as fluxes, binders, and various oxidized asphalts. Data on some typical suitable asphalts are shown below:

| Asphalt | Softening Point, ° F. | Penetration at 77° F. |
|---|---|---|
| Flux A | <75 | >300 |
| Binder C | 113 | 85-100 |
| Oxidized Asphalt 1 | 180-200 | 24 |
| Oxidized Asphalt 2 | 200-235 | 18 |

Also, bitumen subjected to any of the commonly used petroleum or refining and treating processes such as distillation, steam reduction, solvent separation or blending, and the like can be employed. The invention is of particular value with oxidized asphalts, for example, those asphalts prepared by air blowing or chemically oxidizing asphaltic residua at elevated temperatures (400 to 500° F.) with or without the presence of catalytic agents, such as compounds of phosphorus (like phosphorous pentoxide) or of the transition metals (like ferric chloride). These oxidized asphalts commonly have ASTM softening points of at least 100° F., e.g., 100 to 300° F., or higher. These asphalts and especially those oxidized asphalts and straight reduced asphalts having an ASTM softening point of 200° F. and above and an ASTM D-5 penetration at 77° F. of 100 or below, which excludes fluxes, are some of the preferred asphalts of the invention.

In one aspect of the present invention, the foregoing bituminous materials are employed in a volatile organic cutback solvent such as a petroleum naphtha or other solvent boiling within the range of about 175° F. to 600° F., e.g. 200° F. to 400° F. The cutback solvent should preferably be one that is sufficiently volatile to be substantially volatilized during the selected curing step, i.e. a solvent having a boiling point of less than 600° F. or advantageously less than 400° F. Suitable asphalt concentrations in the cutback solution are from 30 to 90 wt. percent asphalt, for example, 50 to 75 wt. percent. Preferably, the Furol viscosity at the temperature at which the cutback is applied should be 100 or less, e.g. 20 to 100 Furol. Suitable cutback solvents would thus include, but are not limited to, hydrocarbons such as toluene, benzene, xylene, mineral spirits, Varnish makers' and Painters' naphtha, Stoddard solvent, kerosene, halohydrocarbons such as carbon tetrachloride and methylene dichloride, or any combinations thereof.

The cutback asphalt compositions may contain other additive agents such as wetting and emulsifying agents and antistripping agents. The asphalt cutback should be used in an amount sufficient to provide at least 5, preferably 8 to about 30 wt. percent asphalt, or higher, based on the soil or finely divided aggregate. Maximum compressive strengths are usually attained with cutback asphalt at 10 to 20, e.g. 12 to 16 wt. percent asphalt. The amount and character of the cutback solvent should be such that the cutback composition will have the proper coating viscosity.

The stabilized solid compositions of this invention, prior to molding, comprise a dry subdivided solid material or finely divided aggregate of a particular size distribution and a bituminous binder, for example a high softening point asphalt binder. Thus, one process of the present invention of forming solid structures of high compressive strength comprises thoroughly mixing the dry subdivided solid material with an asphalt binder cutback composition to provide a relatively thin uniform coating of the binder composition on the solid particles; evaporating the solvent from the solid-binder composition to obtain a substantially dry pulverulent solid mixture containing from about 3 to 30 wt. percent, preferably from about 8 to 30 wt. percent asphalt and small amounts of solvent so that the penetration values (ASTM D-5, 100 g., 5 secs.) of the asphalt-solvent mixture lie in the range of from 20 to +335 mm./10; compacting the dry solid mixture to the desired density or shape; and curing the compacted mass.

Thus, the solid material of the stabilized compositions is any dry inorganic or organic comminuted solid material, with earth and soil the preferred solid materials for the production of hard dense structures useful in building construction. The solid aggregate material may comprise combinations of materials of natural or synthetic origin with or without the presence of clay type soils. For example, suitable combinations include 10 to 60% clay with iron ore fines or other material ranging from 1 to 40%; e.g. 5 to 25%, of the clay-material combination. Suitable nonlimiting examples of other aggregate materials include finely subdivided cinder, expanded slag or clay, rock wool, steel wool, abrasives, expanded clays, cellulose fibers, sawdust, cane fibers, bagasse, hemp, jute, coke, iron ore, diatomaceous earths, clays, soil, silt, coal, asbestos, glass fibers, wood chips, quartz, carbonate rocks, volcanic ash, bamboo, and the like and any combination thereof. The cellulosic and fibrous materials are suitable for use in combination with mineral materials.

Although the presence of clay under certain conditions is essential for high strength asphalt soil structures, non-soil solids do not require the presence of clay. With non-soil structures, the largest particles to be employed should normally not exceed one-third of the smallest dimension of the object to be formed. With small nonsoil objects, a particle size distribution similar to that soil is preferred.

Thus, a wide variety of solids can be used in conjunction with the asphalt binder to form high strength structures. In general, minerals are the preferred solids especially those which have well defined crystal shapes and in particular those crystals which are readily compacted to low voids-content structures. For example, kaolinite, chlorite, talc, mica, specular hematite which crystallize as plates or discs are readily compacted with asphalt to produce high strength structures. Asbestos, which has a fibrous structure, and attapulgite, which crystallizes as needles, are less readily compacted.

As is well known, finely divided solids are more readily compacted to give nonporous structures than coarse. Clays and clay soils are examples of finely divided solids occurring in nature. By the process of the invention they can be used to prepare high strength structures. All types of clay soils can be used, ranging from practically 100% clay content to those with low clay content, if the structure will not be exposed to water. If the structure is to be exposed to water it is essential that the amount of the so-called expanding clays be kept at low levels, and generally below 10%, preferably below 5%. The expanding clays are those which swell in the presence of water or other small polar molecules, and include the montmorillonites (betonites), Vermiculite, and "open-end" illite. Although these clays with asphalt have high dry strength they disintegrate in the presence of water. For use in the presence of water the soil also should not contain appreciable amounts of organic matter or water-soluble salts.

In order to waterproof clay soils with asphalt it is necessary to cover the particles with a thin layer of asphalt. Since the surface area of finely divided solids is high it is not unexpected that larger amounts of asphalt would be needed to provide a protective layer on high clay-content soils. For economic reasons therefore it is desirable to use relatively low clay content soils in asphalt-soil block manufacture. A very satisfactory soil is one which contains about 20–25% clay, the remainder being silt and sand. With this soil 8–12% asphalt by weight on the soil will provide high strength and adequate water repellancy. It will be obvious that sandy, silty, and clayey soils can be blended to achieve the desired particle size distribution.

With some soils and minerals it is possible to obtain high strength with little or no clay or finely-divided particles (below 5µ) present. In these, as mentioned previously, the coarse particles are present as crystals of nearly equi-dimensional size (plates, discs, prisms, etc.) which are easily compacted to low void content structures. When the coarser particles art not of this type, as found in said and some silts, the strength of the asphalt soil blocks will be somewhat lower but may be adequate for applications where high loads will not be applied such as in one-story dwellings.

The particle size of soils is ordinarily determined by ASTM Method D422–54T. In this procedure particle size is calculated from the rate of settling in a water suspension. Although clay soils form agglomerates and aggregates of the primary soil particles they are largely broken up by water. It is thus possible to have a soil which appears to be very coarse on the basis of a dry screen analysis but which shows a high clay content in the ASTM D422–54T grain size analysis. On mixing the soil with asphalt these agglomerates or aggregates are partially permeated by asphalt, and to some extent they are disintegrated into finer particles which are coated by asphalt. Coverage is not complete, however, and one obtains a nonuniform structure which may have low strength and high water sensitivity. It is essential therefore that the large agglomerates be broken up by light grinding or other means approaching as a limit the same state of subdivision as indicated by ASTM D422–54T before mixing with the asphalt.

Overall, soils in which kaolin is the chief clay constituent are preferred for block making. Not only is kaolin of the proper crystal shape for easy compaction but it is readily wetted by asphalt and the asphalt is not as easily displaced by water as with some other clays. There is some evidence also that agglomerates and aggregates of kaolin are broken up during simple mixing with asphalt and accordingly the amount of preliminary crushing is reduced and coverage is more complete.

FIGURE 1 shows the particle size distribution of various soils which have been used successfully in the process of the invention. It will be noted that clay content ($<5\mu$) ranges up to 70%. Generally, desirable soils contain from 10% to 60% clay, with 20% to 40% clay preferred. Among the soils which have been found to be useful are Sayreville sandy clay, N.J. red soil, Houston black clay, Lakeland fine sand, Ruston loamy sand, Cecil coarse sandy loam, Cecil fine sandy loam, Marion loam, Nesherning silt loam, Chester silt loam, Lakeland fine said, Nigerian latterite, Georgia kaolin, etc. Although the soils named above do not contain much gravel (diameter more than 2 mm., equivalent to 10 mesh), soils containing gravel or to which gravel has been added can be employed. Since coarse aggregate such as gravel and coarse sand does not have much surface, not much asphalt is required for coating it, and in practice the 3–30 wt. percent range of asphalt concentration is based on the content of —20 mesh sand and finer particles.

The present invention when using cutback asphalt has importance in the stabilization of earth or soil to form building materials such as blocks, bricks, tile, board, pipe and the like. The soil normally utilized when using cutback asphalt is a mixture of particles varying in size, for example a mixture comprising gravel having an average diameter of over 2 mm., sand having an average diameter of from 2.0 to 0.074 mm., silt having an average diameter of from 0.74 to 0.005 mm., and clay having an average diameter below 0.005 mm. Graded mixtures giving good packing and low porosity are preferred. To utilize the natural strength of clay, it is advantageous to use soils having a clay content of from 10 to 60 wt. percent, e.g. 20 to 40 wt. percent, preferably.

It has further been found that water should not be added to the soil or solid material prior to admixing with the asphalt cutback, since extraneous water is detrimental to the compressive strength and waterproofness of the soil. For the best results, the water content of the soil should not exceed substantially that obtained by air drying the soil at 70° F. For example, with sandy clays, this may be in the range from 0.1 wt. percent to 1.0 wt. percent, while with very fine soils containing large amounts of clay, the normal water content when air dried may be 5 wt. percent or somewhat higher. It is thus advantageous to employ substantially dry soil or aggregate having less than 5% moisture, for example 1 or 2.0 wt. percent or even 0.1 wt. percent.

The invention when using cutback asphalt may be more readily understood by the following examples illustrating the same.

*Example 1*

The criticality of the asphalt concentration in the dry compacted stabilized composition and method may be demonstrated by reference to FIGURE 8, which graphically shows the wet and dry unconfined compressive strengths versus the wt. percent of asphalt employed with the soil. FIGURE 8 was prepared from data obtained on asphalt-stabilized soil compositions prepared by thoroughly mixing an air dried N.J. sandy soil clay soil having a water content of about 0.5% and an average particle size of about 0.11 mm., comprising about 58% sand (2.0–0.074 mm.), 14% silt (0.074–0.005 mm.), and 28% clay (finer than 0.005 mm.), with an oxidized asphalt having an ASTM D–36 softening point of 213° F. and cutback to 50 weight percent with toluene. The diluent in the asphalt-soil mixture was evaporated to about 1.5 wt. percent toluene based on the soil; the asphalt-soil mixture was then dry-compacted into briquettes approximately 1.3 inches in diameter and 3 inches in height at a pressure of 2350 p.s.i.; and then heat-treated for 16 hours at 300° F. The compressive strengths were determined by axial compression of the unconfined briquettes until failure, using a rate of loading of 2 inches/minute.

As is demonstrated in FIGURE 8, the maximum compressive strength, both wet and dry, was obtained at an asphalt concentration of about 12 wt. percent asphalt with the important distinction that little or no change in the difference between wet and dry strength was noted from about 14 to 18 wt. percent asphalt concentrations. At below about 8 wt. percent of asphalt, the dry strength of these briquettes is very low and the wet strength completely unsuitable for most building uses. At concentrations of about 8 wt. percent asphalt and higher suitable compressive strengths are demonstrated. For comparison, FIGURE 8 also shows the compressive strength data obtained on 2" x 2" x 4" specimens cut from commercial cinder blocks. It can be seen that at asphalt concentrations of 10 to 18 wt. percent the asphalt-soil compositions of the invention are decidedly superior to the cinder block. Of course, the optimum percentage of asphalt will vary within the prescribed ranges based on the soil employed. Further, the amount of asphalt required will also increase with increased silt and clay concentration in the soil. For very fine soils like kaolinite (0.005 mm. average), Arizona adobe (0.0025 mm. average), and loess (ca. 0.025 mm. average), the optimum amount of asphalt is 18 wt. percent or even higher. For other types of soil, the optimum amount of asphalt for maximum compressive strength of the compositions is less and maybe as low as 5 wt. percent, the percentage being based on the portion of the soil which passes through a 20 mesh screen.

An important feature of the process is the control of the solvent retention at the time the soil coated asphalt mix is compacted. At compaction, the viscosity of the asphalt solvent mixture is indicated by ASTM D–5 penetration values should be between 20 and +335, e.g. 30 to 250, at the compacting temperature. Otherwise the dry solid mix does not possess sufficient fluidity to obtain structures of high density. Optimum viscosity at the time of compaction can be controlled by employing less cutback solvent, and using higher temperatures such as from 150° F. to 500° F. during compacting. Further, the viscosity can be adjusted by employing asphalts of lower softening points, but this adversely affects the strength of the structure and is not wholly desirable since it also requires extended curing. The advantageous method of controlling viscosity is to evaporate the cutback solvent until the desired viscosity is obtained. The cutback solvent at the time of compaction should be from 0.4 to 4 wt. percent and is preferably from 0.7 to 2.5 wt. percent based on the soil. By the solvent retention process, no water is required as the compacting lubricant, and strong waterproof structures are then obtained.

*Example 2*

The criticality of the amount of solvent retention in the dry admixed soil and asphalt at time of compaction expressed as the concentration of solvent is graphically demonstrated by FIGURE 9. In this test, 12 wt. percent of a 213° F. softening point oxidized asphalt in a 50% cutback of toluene was admixed with N.J. sandy clay as previously described, the soil having an average particle size of 0.11 mm. and containing about 58% sand, 14% silt, and 28% clay. After mixing, the solvent was evaporated to the amounts shown in FIGURE 9, and the dried mixture was then compacted at 2350 p.s.i. and 77° F. The dry compressive strength was then determined for different solvent retention concentrations as shown. Below about 0.4 wt. percent solvent, viscosity of the solvent-asphalt mixture is so high that particle movement is restricted, with the result that structures of low density and low compressive strength are obtained. At slightly higher solvent concentrations of 0.75 wt. percent to 2.5 wt. percent, optimum strengths are obtained for this particular asphalt. Solvent concentrations in excess of 4.0 wt. percent give good fluidity, but due to the voids left in the structure and rupture of the asphalt film by subsequent curing and solvent evaporation, the structures have a lower compressive strength.

The compaction is normally carried out at a pressure of at least about 200 p.s.i. or higher, with the preferred pressures in the range of about 1000 to 5000 p.s.i., e.g. 1500 to 3500 p.s.i. Compaction temperatures may range from 50° F. to 350° F., e.g. 150° to 250° F., or 450° F. or higher. At higher compaction pressures, the viscosity can be on the high side, while at higher compaction temperatures and with softer asphalts, the desired viscosity can be obtained with smaller amounts of solvent retention. Compaction temperature higher than 260° F. is not desirable in general. When the mixing temperature exceeds 258° F. or even 160° F. it is desirable in certain circumstances to cool the mixture to a lower temperature before compaction.

The briquettes or blocks or other compacted structural forms are commonly cured at temperatures from 150° F. to 500° F., such as from 250° F. to 450° F., for sufficient time to allow the compressive and tensile strengths to reach the desired level. The preferred temperature range for the heat-treatment is 350 to 450° F. The curing time, depending upon the conditions employed, may vary from 1 hour to 10 days, e.g. 3 hours to 96 hours. Higher temperatures such as 600° to 800° F. can also be employed if the temperature is raised and lowered slowly to avoid cracking due to thermal shock. Thus, in commercial operations, higher temperatures of 500° to 600° F. with shorter curing time of 1 to 6 hours are possible when the rate of temperature change is controlled. Good strength is normally obtained in from 12 to 18 hours at 300° to 400° F. Of course, it is recognized that the compacting and curing steps may be accomplished together by combining pressure with suitable elevated temperatures.

*Example 3*

The effect of asphalt softening point and penetration on compressive strength is shown in Table I. The soil used was N.J. sandy clay which had been air-dried (0.5% water). It was thoroughly mixed with a 50% toluene cutback solution of asphalt, the solvent and water evaporated to about 1.5 wt. percent, the dry mixture compacted to small briquettes approximately 1.3″ diameter x 3″ high at about 2350 p.s.i. for 5 minutes, cured for 16 hours at 300° F., and then tested for compressive strength, both dry and after soaking in water for 7 days.

TABLE I.—EFFECT OF ASPHALT PENETRATION AND SOFTENING POINT ON COMPRESSIVE STRENGTH

[N.J. sandy clay [1] and asphalt]

| Asphalt | | | | Compressive Strength, p.s.i. | |
| --- | --- | --- | --- | --- | --- |
| Type | Wt. Percent | Pen. at 77° F. | Soft Pt., °F. | Dry | Wet |
| Flux [2] | 16 | | | 290 | |
| Straight Reduced [3] | 12 | 89 | 114 | 1,180 | 1,145 |
| Oxidized [4] | 12 | 15 | 213 | 1,550 | 1,430 |

[1] Sand 58%, silt 14% and clay 28%.
[2] Flux containing 90% 100 Pen. at 77° F. asphalt; 601 Furol vis. at 210° F.
[3] Binder grade, 1770 Furol vis. at 210° F.
[4] Oxidized from Flux [2].

The data in Table I show that hard asphalts having relatively low penetration values and relatively high softening points give substantially higher compressive strengths than softer asphalts. Best results are obtained with asphalts having penetrations at 77° F. of 100 or less and softening points of 100° F. or higher. In general asphalts having penetrations at 77° F. of 90 or less and softening points of 110° F. or higher are preferred, such as asphalts having penetrations at 77° F. of 35 or less and softening point of 135° F. or higher.

*Example 4*

The effect of adding water to the soil prior to mixing with asphalt cutback, as taught by the prior art, is shown by the data in Table II. The briquettes were made and tested in the manner described in Example 3. At asphalt concentrations of 6%, 8% and 10%, and water concentrations of 6%, 8% and 10%, only low compressive strengths of 120 to 270 p.s.i. were obtained (Nos. 1–9). At the 6% asphalt level, with initial water concentrations over the range from zero to 8%, when most of the water and solvent were evaporated prior to compaction, the compressive strengths were somewhat higher being 315–350 p.s.i. dry and 180–220 after soaking in water for 7 days (Nos. 10–14), but on an absolute scale are still low. At the 12% asphalt level, the addition of water to the soil before compaction, even though practically all of it was evaporated prior to compaction, had a marked deleterious effect, reducing the dry strength from 1550 to 1170 p.s.i. and the wet strength from 1450 to 1040 p.s.i. (Nos. 15–16). Thus, the presence of substantial amounts of water (above about 1.0%) during the mixing step or during compaction has a harmful effect. It will also be seen that the compressive strength of the compositions prepared by the process of the present invention far exceeds those of commercial cinder blocks and of the same clay soil stabilized by Portland cement.

TABLE II.—EFFECT OF WATER ON SOIL

[N.J. sandy clay and 213 S.P. oxidized asphalt applied as asphalt/toluene cutback]

| Briquette No. | Asphalt, Wt. Percent | Water in Soil, Percent | Dried Before Compaction | Percent Volatiles at Compaction ($H_2O$ + Solvent) | Compressive Strength p.s.i. | |
| --- | --- | --- | --- | --- | --- | --- |
| | | | | | Dry | Wet |
| 1 | 6 | 6 | No | 13.5 | 220 | |
| 2 | 6 | 8 | No | 15.5 | 170 | |
| 3 | 6 | 10 | No | 17.5 | 130 | |
| 4 | 8 | 6 | No | 13.5 | 220 | |
| 5 | 8 | 8 | No | 15.5 | 180 | |
| 6 | 8 | 10 | No | 17.5 | 120 | |
| 7 | 10 | 6 | No | 13.5 | 270 | |
| 8 | 10 | 8 | No | 15.5 | 240 | |
| 9 | 10 | 10 | No | 17.5 | 160 | |
| 10 | 6 | 0.5 | Yes | 1.0 | 350 | 220 |
| 11 | 6 | 1.0 | Yes | 1.04 | 345 | 200 |
| 12 | 6 | 2.0 | Yes | 1.0 | 350 | 220 |
| 13 | 6 | 4.0 | Yes | 1.04 | 335 | 195 |
| 14 | 6 | 8.0 | Yes | 0.72 | 315 | 180 |
| 15 | 12 | 0.5 | Yes | 1.4 | 1,550 | 1,450 |
| 16 | 12 | 10.5 | Yes | 2.4 | 1,170 | 1,040 |
| 17 | (pc)12 | 10 | | | 180 | |
| 18 | Commercial cinder block [1] | | | | 620 | 560 |

[1] Cinder block specimens cut 2″ x 2″ x 4″.
(pc) Portland cement; cured 2 weeks at 100% humidity.

The relatively poor strengths of materials formed outside of the inventive disclosures can readily be seen, with even asphalt of high softening point failing under the water compaction conditions to impart acceptable dry and wet strength to the stabilized soil.

*Example 5*

The effect of soil type and particle size distribution on compressive strengths employing the inventive dry compaction process is shown in the data of Table III. The data were obtained on briquettes prepared in substantially the same manner as described in conjunction with Table I.

TABLE III.—EFFECT OF PARTICLE SIZE DISTRIBUTION ON COMPRESSIVE STRENGTH

[Briquettes 1.3" x 3" containing 213° F. S.P. oxidized asphalt; compacted at 1-2% volatiles at 2,350 p.s.i.; cured 16 hours at 300° F.]

| | Class | N.J. Red Clay | N.J. Sandy Clay | N.J. Sandy Clay, Washed (+325) | Concrete Sand (−20) | Iowa Loess | Montmorillonite | Georgia Kaolin | |
|---|---|---|---|---|---|---|---|---|---|
| Particle Size, dia. mm.: | | | | | | | | | |
| 2.0 to 0.074 | Sand | 42.3 | 58 | 98.7 | 99.5 | 0.4 | 100 | 0 | |
| 0.074 to 0.005 | Silt | | 14 | | | 79.8 | 0 | 50 | |
| Less than 0.005 | Clay | 57.7 | 28 | 1.3 | 0.5 | 19.8 | 0 | 50 | |
| Less than 0.001 | Colloids | | | | | 14.5 | 0 | 10 | |
| Average diameter, mm | | 0.022 | 0.11 | 0.35 | 0.54 | ca. 0.015 | ca. 0.45 | 0.005 | |
| Asphalt, wt. percent | | 12 | 12 | 12 | 12 | 12 | 18 | 12 | 16 | 24 |
| Compressive Strength, p.s.i.: | | | | | | | | | | |
| Dry | | 1,550 | 1,530 | 760 | 620 | 1,125 | 2,110 | 120 | 1,080 | 1,440 |
| Wet 7 days | | 920 | 1,440 | 680 | 265 | 195 | 445 | | 540 | 1,305 |

The data in Table III show that a wide variety of soils can be stabilized by the process of this invention, the products having compressive strengths exceeding that of commercial cinder blocks and concrete blocks. Thus, a New Jersey sand clay containing 58% sand, and a fine Georgia kaolin containing no sand, can be combined with from 12 to 24% of high softening point asphalt by the process of the invention to give products which have exceptionally high compressive strengths, both dry and wet. The data also show that soils of narrow particle size distribution, such as the washed (+325 mesh) N.J. sandy soil, −20 mesh fraction of concrete sand and coarse montmorillonite give relatively low strengths and are not preferred. On the other hand, the Iowa loess, having no sand, but a fairly wide particle size distribution in the silt, clay and colloid ranges, can be stabilized with fairly large amounts of asphalt by the process of the invention. In general, the solid should contain a substantial amount of particles such as clay having particle diameter sizes less than 0.005 mm. such as between 10% to 60%, preferably 20% to 40%. The average particle size of the −20 mesh fraction is preferably in the range 0.002 mm. to 0.2 mm. in diameter.

*Example 6*

TABLE IV.—EFFECT OF CURING CONDITIONS

[N.J. sandy clay + 12% 213 S.P. oxidized asphalt; percent volatiles at compaction, ca. 1.5%; compaction pressure, 2,350 p.s.i.]

| Curing Conditions | | Compressive Strength, p.s.i. | |
|---|---|---|---|
| Temp., °F. | Time, Hours | Dry | Wet |
| 275 | 240 | 2,220 | 1,710 |
| 300 | 16 | 1,530 | 1,440 |
| 350 | 16 | 2,150 | 1,470 |
| 400 | 16 | 4,075 | 3,050 |
| 500 | 16 | ¹ 2,780 | ¹ 1,015 |

¹ Cracked briquettes.

As demonstrated in Table IV, a variety of time and temperature curing conditions may be employed, but the optimum conditions were about 400° F. for 16 hours. A curing temperature of 500° F., while yielding briquettes of high compressive strength, was not wholly suitable due to the rapid rise in temperature when the compacted briquette was placed in the hot oven. This rapid change in temperature resulted in some cracking of the briquettes through the thermal shock.

*Example 7*

TABLE V.—EFFECT OF COMPACTION PRESSURE

[N.J. sandy clay + 12% 213° S.P. oxidized asphalt compacted at room temperature; cured 16 hours at 300° F.; briquettes 1.3 in. dia. x ca. 3 in. high]

| Compaction Pressure, p.s.i. | Percent Volatiles at Compaction | Density, g./cc. Cured | Compressive Strength, p.s.i., Dry |
|---|---|---|---|
| 3,000 | None | 1.94 | 760 |
| 6,000 | None | 2.06 | 1,185 |
| 9,000 | None | 2.14 | 1,560 |
| 12,000 | None | 2.19 | 1,950 |
| 18,000 | None | 2.21 | 2,110 |
| 3,000 | 2.0 | 2.11 | 1,590 |

The data of Table V show that by retaining a small amount of volatile cutback solvent in soil-asphalt mixture at the time of compaction permits a significant reduction in compacting pressures without a degrading effect on compressive strength or on cured density. Thus, compaction with 2.0% solvent at 3000 lbs. gave compressive strength and density comparable to 9000 lbs. pressure without a solvent.

*Example 8*

TABLE VI.—EFFECT OF ASPHALT SOLVENT VOLATILITY

[N.J. sandy clay + 12% 213 S.P. oxidized asphalt compacted at 2,350 lbs. at 70° F.; cured 16 hours at 300° F.]

| Solvent | Boiling Point, °F. | Percent Aromatics | Percent Volatiles at Compaction | Compressive Strength, p.s.i. | |
|---|---|---|---|---|---|
| | | | | Dry | Wet |
| Toluene | 240 | 100 | 1.9 | 1,530 | 1,500 |
| Naphtha | | 15 | 2.1 | 1,280 | |
| Initial | 319 | | | | |
| 50% | 335 | | | | |
| 90% | 357 | | | | |
| Final | 390 | | | | |
| Naphtha as above | | 15 | 2.6 | 1,250 | 1,170 |

The data of Table VI demonstrate that high boiling solvents are not desirable, probably because in this case the asphalt is softened by small amounts of solvent which remain even after curing. In order to form briquettes having a compressive strength approaching that or similar to concrete, the curing temperature or time should be selected to drive off substantially all the compaction solvent such as over 90%, e.g. over 95%, and yield a hard binder. Solvents having a boiling point of less than 400° F. are preferred, while solvents having a boiling point of less than 300° F. are especially advantageous.

Example 9

TABLE VII.—TENSILE STRENGTH

[Binder, 12% 213 S.P. oxidized asphalt or Portland cement; compaction 2,350 p.s.i. at 70° F.]

| Composition | | Curing | Dry Strength, p.s.i. | |
|---|---|---|---|---|
| Solid | Binder | | Compressive | Tensile [1] |
| N.J. Sandy Clay | Asphalt. | 300° F., 16 hours. | 1,545 | 136 |
| Do | ---do--- | 350° F., 16 hours. | 2,150 | 366 |
| Do | Cement. | 14 days, 100% humidity. | 180 | |
| Do | ---do--- | 6 mos., 100% humidity. | | 50 |
| Sand-Gravel | Cement. | | [2] 2,000 | [2] 200 |
| Do | ---do--- | | [2] 3,000 | [2] 250 |
| Do | ---do--- | | [2] 5,000 | [2] 360 |
| Commercial Cinder Block [3]. | | | 620 | 92 |

[1] On 1.3″ x 3″ cylinders, see—"The Indirect Tension Test for Concrete," by N. B. Mitchell, ASTM Materials Research and Standards, 780, October 1961.
[2] Literature values for 3 inch dia. x 6 inch high specimens.
[3] Cinder block specimens cut 2″ x 2″ x 4″.

The data of Table VII demonstrate that asphalt-soil stabilized compositions of the instant invention have tensile strengths exceeding that of commercial cinder blocks and clay soil stabilized with Portland cement. For thoroughly cured asphalt-soil compositions, the ratio of tensile strength to compressive strength is higher than for high quality concrete.

Example 10

The application of the technique of the instant invention to the preparation of shaped articles of manufacture such as pipe from asphalt and clay soil is shown in Table VIII, where it will be seen that crushing and brusting strengths adequate for conduits, water and sanitary uses are readily obtained from asphalt-clay pipe structures.

TABLE VIII.—ASPHALT-CLAY SOIL PIPE

[New Jersey sandy clay soil, 12% 213° S.P. oxidized asphalt]

| | |
|---|---|
| Curing, 300° F. hours | 16 |
| Compaction pressure p.s.i. | 10,000 |
| 1⅝″ O.D. | |
| 1⅛″ I.D. | |
| Crushing strength lbs./ft | 2130 |
| Bursting strength p.s.i. | 300 |

Example 11

TABLE IX.—OTHER ASPHALT STABILIZED SOLID COMPOSITIONS

[213° S.P. oxidized asphalt (as cutback), cured 16 hours at 300° F.]

| Solid | Percent Asphalt | Compressive Strength, p.s.i. |
|---|---|---|
| Fluid Coke | 26 | 1,330 |
| $Fe_2O_3$ | 18 | 1,400 |
| Graphite | 12 | 790 |

By using the method of this invention, it will be seen by the data in Table IX that high strength structures can be obtained from petroleum coke prepared by the fluid coking process (95% passes a 200 mesh screen), finely divided iron ore (92.3% passes a 325 mesh screen), and commercial graphite.

The asphalt can also be incorporated with the subdivided solid while in the molten state and this is generally the preferred method. The temperature of the asphalt at the time of mixing should be such that the viscosity is sufficiently low that good mixing is achieved. Suitable asphalt viscosities are in the range of from 20 to 100 Furol, corresponding to mixing temperatures from about 275° F. in the case of soft asphalts such as fluxes, to 350°–450° F. in the case of harder asphalts such as binders and oxidized asphalts. In general, it can be stated that the hot mix is in the general range of about 200° to 450° F., preferably in the range from about 300° to 400° F. In carrying out the hot-mixing operation, the solid is generally pre-heated and charged to the mixer, and the molten asphalt is then pumped in. It is usually sufficient to introduce the asphalt as a low pressure spray, although atomized or foamed asphalt can be used. Various commercial mixers are suitable, such as the type of paddle mill known as a pug mill. Where an efficient mixer is employed, the time of mixing can be relatively short, such as one or two minutes. In some cases, however, it may be desirable to extend the mixing time to say 15–30 minutes or longer in order to harden the asphalt after incorporation with the solid. For example, it has been found that when starting with flux or binder asphalts, stronger structural products are obtained if the asphalt is hardened in this fashion by heating in air, say at 400° F., after mixing with the solid, but before compacting the mixture. Conversely, when starting with a hard asphalt such as an air-blown asphalt, it may be desirable to blanket the mixer with inert gas so as to decrease the rate of hardening. When hot mixing, very desirable results are secured by using a Binder Grade asphalt (penetration 85 to 100 at 77° F.).

Generally, it is preferable to mix the asphalt cutback or the molten asphalt with solid that is relatively dry, having not more than 1–2% moisture. When solid containing considerable water is employed, it is preferable to dry the solid-asphalt mixture to a fairly low water content prior to compaction. If this precaution is observed, emulsified asphalt cutbacks can be employed in the process of the invention. The amount of asphalt employed is in the range from about 5% or 8% to 30% by weight, based on the finely divided solid. Generally, the amount employed is in the range from about 8% or 10% to 20%, preferably 8% to 12%.

The development of high strength materials from finely divided solids and residua (asphalts) depends to a marked extent on high temperature curing, e.g. 300°–500° F. Preferred curing temperatures are in the range from about 350° to 425° F. The time of curing depends on the temperature level, the higher rate temperature the shorter the time needed. Curing times are from about 2 to 80 hours, such as about 16 hours.

The principal mechanism involved in the formation of high strength materials from solids and asphalt is not known, but it appears to be oxidation of the asphalt, although the evolution of volatile material is also involved to some extent. The volatile material may be present in the original asphalt or subsequently produced by cracking and oxidation.

That oxidation is probably the chief mechanism is shown by comparing the results of curing in air versus nitrogen. In the latter case, with clay soil and asphalt, the compressive strength was less than one-half of those cured in air.

To develop high strength during curing, the compacted solid-asphalt structure should have sufficient porosity to permit the diffusion of oxygen into the interior of the structure and to permit the egress of volatile materials without disrupting the binder (asphalt) films. The solid particles however must be sufficiently close together so that the greater part of the binder is present as a very thin, nearly-continuous phase if high strength is to be developed on curing. Thus, if there is insufficient binder to cover most of the solid particles with very thin films and if compaction is not carried to the point where the solids are brought in close proximity, low strength especially in the presence of water, will result. On the other hand, if an excess of asphalt is present, thick films will be formed and low strength will result on curing, regardless of the degree of compaction. At low densities the strength of the structure would not be expected to be much greater than that of asphalt by itself. At high densities diffusion of oxygen into the interior of the structure and even into the interior of the thick binder films is retarded and more significantly the evolution of volatile materials is impeded. The latter effect results in severe cracking during curing and produces both deformation and low strength.

In order to designate a suitable range of density (degree of compaction) for the development of high strength an expression "Percent of Theoretical Density" has been formulated which is defined as follows:

Percent of Theoretical Density=percent of the density the solid+binder would have if there were no voids in the compacted structure.

A sample calculation would be: A compacted mixture of clay soil ($d=2.61$ g./cc.) with 10 wt. percent asphalt based on the soil ($d=1.04$ g./cc.) is found to have a density of 2.08 g./cc. The theoretical density (no voids) of this mixture would be $$\frac{100}{2.61} + \frac{10}{1.04} = \frac{110}{x}$$

$$x = 2.29$$

$$\text{percent of Theor. Den.} = \frac{2.08}{2.29} \times 100 = 90.8\%$$

With sandy clay soils containing about 20–25% clay ($<5\mu$ particle size) and 9–12% by weight asphalt, the desired percentage of theoretical density is usually within the range 88 to 98%, the exact level depending upon factors such as the concentration of asphalt, curing conditions, and the size and shape of the article being molded.

To achieve the advantages of the invention, the asphalt-solid mixture should be compacted to a density in the range from about 70–98% of the theoretical density, preferably 80–98%, a more preferred range being from about 80–95%, and the most preferred being 85–95%. In many cases, maximum strength is developed in a still narrower range, such as 88–92%. The optimum percent theoretical density varies with a number of factors, such as asphalt concentration, compaction temperature, presence of solvent at the time of compaction, curing conditions, and the size and shape of the article being molded. For example, with sandy clay soils containing about 20–25% clay ($<5\mu$ particle size) and 10–12 wt. percent asphalt, the optimum density is usually in the range from about 88–94% theoretical density, while with 9% asphalt the optimum may be higher, such as about 96%. Also, whereas the optimum may be about 92% in the case of 1.28″ diameter x 3″ high briquettes, it may be about 88% in the case of 8″ x 4″ x 2.5″ bricks. Suitable compaction temperatures are from 50° to 350° F., preferably from 60° to 200° F.

The present invention may be more fully understood by reference to the following examples illustrating the same when employing non-cutback asphalts.

*Example 12*

Cylindrical briquettes, approximately 3″ long and 1.28 sq. in. cross-section were made by double-end compaction at 75° F. holding for 5 minutes under different compaction pressures, using a mixture of a New Jersey sandy clay soil and an asphalt normally used in road building (known in the trade as Binder C, 85–100 Pen. at 77° F.). The compacted briquettes were then cured in a heated-air oven using temperatures in the range from about 300° to 450° F. Compressive strengths were obtained before and after immersion in water for 7 days (75° F.), using a loading rate of 2 inches per minute. Water absorption (weight increase) after 7 days of immersion was also obtained.

The N.J. sandy clay soil, (referred to as SLS–3 soil) which is mined in the Sayreville area and which may be used for the manufacture of common or refractory bricks, showed the following grain-size analysis in ASTM Method D422–54T: 21% clay ($<5\mu$), 18% silt (0.005–0.074 mm.), and 61% sand (0.074–2.0 mm.).

The mixing of the clay soil and asphalt was carried out in a Hobart Mixer. The soil and asphalt were heated separately to 400° F. and then the asphalt was added to the soil in the mixer maintained at 400° F.

TABLE X.—SOIL–ASPHALT VARIABLE STUDY

[N.J. sandy soil (SLS–3)+9 wt. percent binder C asphalt briquettes, 1.28″ diameter x 3″ (approx.)]

| Compaction Load, lbs | 2,000 | 3,000 | 4,000 | 6,000 | 8,000 | 10,000 | 12,000 | 14,000 | 18,000 | 24,000 |
|---|---|---|---|---|---|---|---|---|---|---|
| Series A, Cured 88 Hours at 300° F.: | | | | | | | | | | |
| Percent Theoretical Density | 82.4 | 84.5 | 86.3 | 89.5 | 91.5 | | | | | |
| Evaporation Loss, g | 0.2 | 0.1 | 0.2 | 0.2 | 0.2 | | | | | |
| Compressive Strength, p.s.i. Dry | 710 | 1,080 | 1,300 | 1,970 | 2,460 | | | | | |
| Series B, Cured 16 Hours at 350° F.: | | | | | | | | | | |
| Percent Theoretical Density | 82.5 | 84.5 | 86.5 | 89.0 | 91.4 | 92.4 | 93.8 | 95.2 | | |
| Evaporation Loss, g | 0.4 | 0.3 | 0.4 | 0.3 | 0.3 | 0.3 | 0.3 | 0.3 | | |
| Compressive Strength, p.s.i.: | | | | | | | | | | |
| Dry | 695 | 950 | 1,070 | 1,545 | 1,845 | 1,975 | 2,245 | 2,640 | | |
| Wet | 430 | 560 | 790 | 1,010 | 1,300 | 1,450 | 1,900 | 2,040 | | |
| Water Absorption, g | 3.1 | 1.9 | 2.0 | 1.9 | 1.3 | 1.1 | 0.9 | 0.8 | | |
| Series C, Cured 16 Hours at 400° F.: | | | | | | | | | | |
| Percent Theoretical Density | 82.4 | 84.5 | 86.3 | 89.5 | 91.5 | 92.2 | 94.0 | 95.2 | 96.6 | 98.0 |
| Evaporation Loss, g | 0.7 | 0.7 | 0.7 | 0.6 | 0.5 | 0.5 | 0.5 | 0.5 | 0.5 | 0.3 |
| Compressive Strength, p.s.i.: | | | | | | | | | | |
| Dry | 895 | 1,160 | 1,605 | 2,295 | 2,470 | 3,910 | 4,180 | 5,050 | 5,480 | 5,310 |
| Wet | 550 | 805 | 925 | 1,540 | 1,745 | 2,345 | 2,690 | 2,860 | 3,450 | 3,380 |
| Water Absorption, g | 3.0 | 2.7 | 2.3 | 1.8 | 1.5 | 1.3 | 1.2 | 1.0 | 1.1 | 1.0 |
| Series D, Cured 16 Hours at 425° F.: | | | | | | | | | | |
| Percent Theoretical Density | 82.4 | 84.6 | 86.5 | 89.3 | 91.4 | 93.5 | 94.4 | 95.6 | | |
| Evaporation Loss, g | 1.3 | 1.3 | 1.2 | 1.0 | 0.9 | 0.8 | 0.8 | 0.8 | | |
| Compressive Strength, p.s.i.: | | | | | | | | | | |
| Dry | 850 | 1,230 | 1,640 | 2,070 | 3,030 | 3,665 | 4,270 | 4,820 | | |
| Wet | 415 | 615 | 765 | 1,280 | 1,520 | 2,210 | 2,350 | 2,775 | | |
| Water Absorption, g | 14.0 | 12.0 | 10.6 | 6.6 | 4.4 | 3.9 | 3.3 | 2.9 | | |
| Series E, Cured 16 Hours at 450° F.: | | | | | | | | | | |
| Percent Theoretical Density | 82.4 | 84.6 | 86.5 | 89.3 | 91.4 | | | | | |
| Evaporation Loss, g | 2.1 | 1.8 | 1.9 | 1.7 | 1.6 | | | | | |
| Compressive Strength, p.s.i.: | | | | | | | | | | |
| Dry | 685 | 975 | 1,405 | 2,195 | 2,730 | | | | | |
| Wet | 225 | 350 | 470 | 740 | 1,115 | | | | | |
| Water Absorption, g | 14.3 | 12.2 | 11.5 | 9.3 | 7.5 | | | | | |

TABLE XI.—SOIL-ASPHALT VARIABLE STUDY

[N.J. sandy clay (SLS-3)+10 wt. percent binder C asphalt briquettes, 1.28" diameter x 3" (approx.)]

| Compaction Load, lbs | 2,000 | 3,000 | 4,000 | 6,000 | 8,000 | 10,000 | 12,000 | 14,000 |
|---|---|---|---|---|---|---|---|---|
| Series A, Cured 88 Hours at 300° F.: | | | | | | | | |
| Percent Theoretical Density | 83.8 | 87.6 | 89.0 | 91.5 | 93.8 | | | |
| Evaporation Loss, g | 0.1 | 0.1 | 0.1 | 0 | 0 | | | |
| Compressive Strength, p.s.i., Dry | 1,230 | 1,725 | 1,970 | 2,320 | 2,790 | 0 | 0 | 0 |
| Series B, Cured 16 Hours at 350° F.: | | | | | | | | |
| Percent Theoretical Density | 83.8 | 86.2 | 89.0 | 91.5 | 93.8 | 95.8 | 96.7 | 98.0 |
| Evaporation Loss, g | 0.3 | 0.2 | 0.1 | 0.2 | 0.2 | 0.1 | 0.1 | 0.1 |
| Compressive Strength, p.s.i.: | | | | | | | | |
| Dry | 1,370 | 1,650 | 1,735 | 2,180 | 2,430 | 2,280 | 2,110 | 2,025 |
| Wet | 985 | 1,150 | 1,595 | 2,010 | 2,150 | 2,225 | 2,060 | 2,025 |
| Water Absorption, g | 1.8 | 1.5 | 1.3 | 1.0 | 0.8 | 0.4 | 0.4 | 0.3 |
| Series C, Cured 16 Hours at 400° F.: | | | | | | | | |
| Percent Theoretical Density | 83.8 | 87.0 | 88.5 | 91.8 | 93.8 | 95.3 | 96.8 | 98.0 |
| Evaporation Loss, g | 0.5 | 0.5 | 0.4 | 0.3 | 0.3 | 0.3 | 0.3 | 0.3 |
| Compressive Strength, p.s.i.: | | | | | | | | |
| Dry | 2,610 | 2,930 | 4,175 | 5,325 | 4,405 | 3,055 | 2,390 | 1,945 |
| Wet | 1,450 | 2,060 | 2,575 | 3,380 | 3,315 | 2,405 | 2,065 | 2,025 |
| Water Absorption, g | 3.7 | 1.6 | 1.2 | 0.9 | 0.8 | 0.5 | 0.4 | 0.4 |
| Series D, Cured 16 Hours at 425° F.: | | | | | | | | |
| Percent Theoretical Density | 83.8 | 85.5 | 88.0 | 90.6 | 93.8 | 95.5 | 97.0 | 98.4 |
| Evaporation Loss, g | 1.0 | 0.9 | 0.8 | 0.7 | 0.5 | 0.4 | 0.4 | 0.4 |
| Compressive Strength, p.s.i.: | | | | | | | | |
| Dry | 2,990 | 3,015 | 4,180 | 5,380 | 5,970 | 2,540 | 1,800 | 1,460 |
| Wet | 1,710 | 2,080 | 2,295 | 3,450 | 3,235 | 2,170 | 1,845 | 1,740 |
| Water Absorption, g | 10.1 | 9.7 | 4.4 | 2.4 | 1.2 | 0.9 | 0.7 | 0.4 |
| Series E, Cured 16 Hours at 450° F.: | | | | | | | | |
| Percent Theoretical Density | 83.8 | 86.2 | 88.0 | 9.14 | 93.8 | | | |
| Evaporation Loss, g | 1.8 | 1.5 | 1.3 | 1.1 | 0.8 | | | |
| Compressive Strength, p.s.i.: | | | | | | | | |
| Dry | 2,085 | 2,760 | 3,800 | 5,505 | 4,290 | | | |
| Wet | 945 | 1,410 | 1,700 | 2,525 | 2,945 | | | |
| Water Absorption, g | 10.6 | 8.8 | 7.3 | 5.1 | 2.7 | | | |

TABLE XII.—SOIL-ASPHALT VARIABLE STUDY

[N.J. sandy clay (SLS-3) + 12 wt. percent binder C asphalt briquettes, 1.28" diameter x 3" (approx.)]

| Compaction Load, lbs | 2,000 | 3,000 | 4,000 | 6,000 | 8,000 |
|---|---|---|---|---|---|
| Series A, Cured 88 Hours at 300° F.: | | | | | |
| Percent Theoretical Density | 88.0 | 91.2 | 93.4 | 96.4 | 98.3 |
| Evaporation Loss, g | 0 | 0 | 0 | 0 | 0 |
| Compressive Strength, p.s.i., Dry | 1,850 | 2,420 | 2,735 | 3,200 | 2,990 |
| Series B, Cured 16 hours at 350° F.: | | | | | |
| Percent Theoretical Density | 87.2 | 90.5 | 93.0 | 96.0 | 98.2 |
| Evaporation Loss, g | 0.1 | 0 | 0 | 0 | 0 |
| Compressive Strength, p.s.i.: | | | | | |
| Dry | 1,770 | 2,210 | 2,500 | 2,150 | 1,585 |
| Wet | 1,670 | 1,975 | 2,175 | 2,180 | 1,680 |
| Water Absorption, g | 1.4 | 1.2 | 1.0 | 0.7 | 0.4 |
| Series C, Cured 16 Hours at 400° F.: | | | | | |
| Percent Theoretical Density | 88.0 | 91.2 | 93.4 | 96.4 | 98.3 |
| Evaporation Loss, g | 0.4 | 0.3 | 0.2 | 0.2 | 0.2 |
| Compressive Strength, p.s.i.: | | | | | |
| Dry | 3,810 | 5,330 | 5,065 | 1,825 | 1,500 |
| Wet | 2,560 | 3,840 | 3,335 | 2,030 | 1,415 |
| Water Absorption, g | 1.8 | 0.9 | 1.0 | 0.6 | 0.4 |
| Series D, Cured 16 Hours at 425° F.: 9 | | | | | |
| Percent Theoretical Density | 87.2 | 90.6 | 93.0 | 96.0 | 97.7 |
| Evaporation Loss, g | 0.7 | 0.5 | 0.5 | 0.3 | 0.2 |
| Compressive Strength, p.s.i.: | | | | | |
| Dry | 3,650 | 4,530 | 5,625 | 1,875 | 1,420 |
| Wet | 3,210 | 3,335 | 4,240 | 2,015 | 1,490 |
| Water Absorption, g | 8.0 | 5.0 | 3.0 | 1.0 | 0.7 |
| Series E, Cured 16 Hours at 450° F.: | | | | | |
| Percent Theoretical Density | 88.0 | 90.6 | 93.0 | 96.0 | 97.7 |
| Evaporation Loss, g | 1.0 | 0.9 | 0.7 | 0.5 | 0.4 |
| Compressive Strength, p.s.i.: | | | | | |
| Dry | 4,130 | 4,550 | 5,535 | 1,625 | 1,360 |
| Wet | 1,895 | 2,650 | 3,720 | 1,600 | 1,320 |
| Water Absorption, g | 9.3 | 6.1 | 3.6 | 1.5 | 0.8 |

Total mixing time was 18–20 minutes. The mixture was then rapidly cooled to room temperature as the agitaiton was continued. The resulting product was a free-flowing powder which poured readily into the compaction mold.

The composition, the compaction and curing conditions, and the test results for these experiments are given in Table X, (9% asphalt), Table XI (10% asphalt), and Table XII (12% asphalt). Some significant data from these tables are plotted in FIGURES 2, 3, 4 and 5.

*Example 13*

In the preparation of very high strength soil-asphalt structures it is necessary to compact to relatively high density, generally greater than 88% of the theoretical density. The compaction pressure required to produce these levels of density is high when the concentration of asphalt or residium on the soil is low but decreases as the asphalt concentration is raised. As shown by the data in Table XIII, with 9 wt. percent asphalt on SLS soil, the compaction pressure required to give 96% of theoretical density is 12,500 p.s.i. which would be above the capacity of most commercial presses if blocks of appreciable size were being formed. Increasing the asphalt concentration to 12%, however, decreases the compaction pressure required to about one-third of that for the 9% mixture.

TABLE XIII.—COMPACTION PRESSURE VS. BRIQUETTE DENSITY

[N.J. sandy clay (SLS-3)+ binder C asphalt briquettes, 1.28" diameter x 3" (approx.)]

| Wt. Percent Asphalt (on soil) | Compaction Pressure, p.s.i., to Give Indicated Percent of Theoretical Density | |
|---|---|---|
| | 90 | 96 |
| 9 | 5,500 | 12,500 |
| 10 | 4,000 | 7,800 |
| 12 | 2,200 | 4,500 |

The compaction pressure required to produce these density levels can be reduced by increasing the temperature of compaction or by using softer asphalt or by including a small amount of asphalt solvent. These techniques result in briquettes or blocks having lower "green" strength and greater care is needed in handling them prior to curing.

*Example 14*

Asphalt-soil briquettes can be readily formed which have unconfined compressive strength values above those of commercial cinder or concrete blocks or bricks. With the SLS sail and Binder C asphalt mixtures, values above 5000 p.s.i. are readily obtained with asphalt concentrations in the range 9 to 12 wt. percent on the soil. However, at the various levels of asphalt concentration different process conditions are required for maximum strength. Thus, as the asphalt concentration is raised the optimum density and compaction pressure decrease. These points are illustrated by the data in Table XIV and by the plots in FIGURES 2 and 3.

TABLE XIV.—PROCESS CONDITIONS FOR MAXIMUM DRY STRENGTH

[N.J. sandy clay (SLS-3) + binder C asphalt briquettes, 1.28" diameter x 3" (approx.)]

| Wt. Percent Binder C | 9 | 10 | 12 |
|---|---|---|---|
| Maximum Compressive Strength, p.s.i. | 5,500 | 6,000 | 5,600 |
| Percent of Theoretical Density | 97 | 94 | 93 |
| Compaction Pressure, p.s.i. | 14,000 | 6,200 | 3,150 |
| Curing Temperature, °F | 425 | 425 | 425 |

The optimum curing temperature for maximum dry strength for SLS soil and Binder C appears to be in the range 400°–425° F. If cured at 350° F. (16 hours) or 300° F. (88 hours) the briquettes are under-cured. At 450° F. (16 hours) the briquettes are over-cured, the briquettes developing cracks particularly at the higher densities and higher asphalt concentrations.

*Example 15*

The briquettes prepared as in Example 12 were evaluated for compressive strength after immersion in water at 75° F. for 7 days. (Hereafter referred to as wet compressive strength.) In general the results parallel those given in Example 14 for dry compressive strength. Best results are obtained with 12% asphalt (based on soil) compacting to a percent of theoretical density of about 90 to 94% and curing at 425° F. (16 hours). With 12% asphalt a compaction pressure of about 2000–3000 p.s.i. provides optimum density. The results are plotted in FIGURES 4 and 5.

*Example 16*

The briquettes described in Example 12 were tested for water absorption after 7 days immersion at 75° F. The values reported are grams of water absorbed per 125 gram briquette.

Low water absorption is favored by low curing temperature, high asphalt concentration, high compaction pressure and high density. In order to keep water absorption below the 1% level the following compaction pressures (Table XV) would be needed at the various asphalt concentrations and curing conditions.

TABLE XV.—MINIMUM COMPACTION PRESSURE, P.S.I. TO LIMIT WATER ABSORPTION TO <1 WT. PERCENT

| Binder C, Wt. Percent | 9 | 10 | 12 |
|---|---|---|---|
| Curing Temperature, °F.: | | | |
| 350 | 8,000 | 3,100 | 2,350 |
| 400 | 9,400 | 2,750 | 2,200 |
| 425 | >11,000 | 6,200 | 4,700 |
| 450 | >15,000 | >8,000 | 5,500 |

Under comparable test conditions cinder and concrete blocks and bricks show a much higher degree of water absorption (10 wt. percent or greater).

*Example 17*

In the previous examples the briquettes were prepared by hot mixing at 400° F. a binder-grade asphalt (Pen. 77° F. of 89) with a clay soil. In this example a harder asphalt (Pen. 77° F. of 18) prepared by air-blowing was applied to the soil in cutback form (50 wt. percent in toluene) at 75° F., and the bulk of the solvent removed prior to compaction (1.5 wt. percent solvent, based on the soil, remained). The soil, also a N.J. sandy clay soil, referred to as SR-1 soil, contained 23% clay (<5μ), 19% silt, and 58% sand. Curing was carried out at 350° F. for 16 hours.

The compressive strength and compaction pressure data from these experiments are shown in FIGURE 6. When the asphalt concentration was 12 or 14% (on soil) the mixtures were easily over-compacted, and in such cases the resulting briquettes had lower strength than those prepared with 10 or 10.6 wt. percent asphalt.

*Example 18*

In some applications, as in flooring, garages, and piping, structural materials must be able to withstand the attack of hydrocarbons. It has been found that asphalt-soil briquettes which have been cured at 400° F. or higher are no more susceptible to the attack of hydrocarbons than to water. When the briquettes are cured at a considerably lower temperature, e.g. at 300° F. however, the disintegrate within a few hours when immersed in hydrocarbon solvents.

The effect of isooctane and a hydrocarbon solvent, (a mineral spirits called "Varsol") on briquettes cured at 400° F. is shown by the data in Table XVI.

TABLE XVI.—EFFECT OF HYDROCARBONS ON SOIL-ASPHALT BRIQUETTES

[SLS-3 soil + binder C, mixed at 400° F.; compacted at 4,700 p.s.i.; cured 16 hours at 400° F.]

| Asphalt, Wt. Percent | | Dry | After Immersion 7 Days | | |
|---|---|---|---|---|---|
| | | | Varsol | Isooctane | Water |
| 10 | Comp. Strength, p.s.i. | 4,630 | 3,020 | 3,470 | 3,520 |
| | Absorption, wt. percent | | 3.8 | 3.0 | 0.9 |
| 11 | Comp. Strength, p.s.i. | 4,680 | 3,480 | 4,060 | 3,420 |
| | Absorption, wt. percent | | 3.8 | 3.0 | 0.7 |

Only a trace of color was picked up by the hydrocarbons during the period of immersion. It thus appears that the solubility characteristics of the asphalt have been so radically altered by curing that it can no longer be considered an asphalt.

*Example 19*

(a) A New Jersey sandy clay soil (SR #1) containing substantially no montmorillonite was mixed with a 50—50 toluene cutback of 213° F. softening point oxidized asphalt, and the toluene was evaporated down to a concentration of 1.5 wt. percent based on the soil. The resulting mixture, containing 12 wt. percent asphalt based on the soil, was compacted into cylindrical briquettes (1.28" diameter x about 3" high) and the briquettes were cured for 16 hrs. at 350° F.

(b) The above experiment was repeated using a mixture of 90 wt. percent of the same sandy clay soil and 10 wt. percent of bentonite (a form of montmorillonite) from Big Horn, Wyoming. In this case, 14 wt. percent of asphalt was used rather than 12%, to take care of the fine bentonite. The cured briquettes from the two experiments were subjected to compressive strength measurements, both dry and after soaking in water for 7 days, and the results are given in Table XVII.

TABLE XVII.—EFFECT OF MONTMORILLONITE

[Briquettes cont'g 213° F. S.P. oxidized asphalt cured 16 hours at 350° F.]

| Sandy Clay Soil, Percent | Bentonite Montmorillonite, Percent | Briquette Density, Percent Theoretical | Compressive Strength, p.s.i. | |
|---|---|---|---|---|
| | | | Dry | Wet 7 Days |
| 100 | 0 | 92.7 | 3,360 | 3,000 |
| 90 | 10 | 92.2 | 2,210 | 1,080 |

It can be seen from the data in Table XVII that the presence of montmorillonite in soil has a marked deleterious effect on the dry strength and especially on the wet strength of soil-asphalt structures made according to the invention. In general, the montmorillonite should be no more than 10%, and soils containing less than 5% are preferred.

Example 20

Full-size bricks (7⅝" long x 3⅝" wide x about 2¼" high) were made as follows: SLS sandy clay soil was mixed with 10.5 wt. percent of Binder C asphalt in a 5-gallon Hobart mixer. The mixing temperature was 400° F. and the total time of mixing was 18 minutes. After cooling and screening through a 10-mesh screen, the soil-asphalt mixture was compacted flat-wise in a brick mold, using double-ended compaction.

Bricks were made at three compaction temperatures, 75° F., 160° F., and 225° F. At each temperature, the final compaction pressure was varied over the range shown in Table XVIII, in order to obtain bricks of different densities. The bricks were cured by heating in air at 400° F. for 16 hours. They were then sawed in half, and the compressive strength of the brick-bats (flat-wise) was determined. The results are shown in the upper part of FIGURE 7 in which compressive strength is plotted against brick density, the latter being expressed at the percent of the theoretical density. As will be seen from FIGURE 7, compressive strength increased rapidly as the brick density was increased above 80% of the theoretical density. It will also be seen that compressive strength was at a maximum in the neighborhood of 88% to 92% theoretical density, and decreased sharply on the high side of the maximum. In an extreme case, another brick was compacted at 160° F. to 97% theoretical density. On curing for 16 hours at 400° F., this brick developed severe cracks (more than ⅛") and was badly deformed.

In the lower righthand portion of FIGURE 7 are shown the results obtained in six series of experiments, in which cylindrical briquettes (1.28" diameter x about 3" high) were made using two soils, two asphalts, and the various compaction and curing conditions summarized in Table XVIII. It will be noted that sharp maxima occur in the range of 90–94% theoretical density. The maxima for the briquettes appear to occur at slightly higher percent theoretical densities than for the bricks, which is probably a reflection of the difference in size and shape. In every case, however, the maxima occur in the range from 80–95%.

TABLE XVIII.—SUMMARY DATA ON EXAMPLE 20 EXPERIMENTS
[See Figure 7]

| Code | Soil | Sample | Asphalt | | Compaction | | | Curing, °F. |
|---|---|---|---|---|---|---|---|---|
| | | | Percent | Type | P.s.i. | °F. | Percent Solv. | |
| 1 | SR | Briquette | 12 | 220 Ox | 2,340 | 200–450 | 0 | 350 |
| 2 | SR | do | 12 | BC | 200–4,000 | 350 | 0 | 350 |
| 3 | SR | do | 12 | 220 Ox | 1,900–7,500 | 75 | 1.5 | 350 |
| 4 | SLS | do | 11 | BC | 1,700–6,100 | 210 | 0 | 350 |
| 5 | SLS | do | 11 | BC | 2,000–8,750 | 75 | 1 | 350 |
| 6 | SLS | do | 11 | BC | 2,100–6,000 | 75 | 1 | 350 |
| 7 | SLS | Brick | 10.5 | BC | 440–3,800 | 225 | 0 | 400 |
| 8 | SLS | do | 10.5 | BC | 500–1,400 | 160 | 0 | 400 |
| 9 | SLS | do | 10.5 | BC | 1,000–4,100 | 75 | 0 | 400 |

Example 21

Bricks were made by the process of the invention, using commercial mixing and brick-making equipment. Six tons of SLS sandy clay soil were mixed with 10 wt. percent of Binder C asphalt in an asphalt aggregate mixing plant. The soil was heated to 340–360° F. in the plant's rotary heater and was charged to a pug mill mixer in one-ton batches. Molten asphalt was sprayed into the mill, mixing was continued for 1–2 minutes, and the mixture was discharged into a dump truck. Operation of the mixing plant was normal except for dust formation in the heater, indicating that an indirectly fired heater would be preferable to a directly fired one. The soil-asphalt mixture, after cooling, was screened through a 10-mesh screen prior to compaction.

The soil-asphalt mixture prepared as described above was charged to the hopper of a commercial automatic brick press (Chisholm, Boyd & White Co., Model X) and was compacted into bricks 9" long, 4½" wide and 2½" high. The press compacted two bricks simultaneously at the rate of about 8 seconds per cycle. The soil-asphalt mixture flowed freely from the hopper into the mold charger and from the charger into the brick mold. Using this equipment, bricks were made having various densities within the scope of this invention. The bricks had good green strength (before curing) and gave no handling difficulties. They were cured by heating for 16 hours at 400° F. The cured bricks had sharp corners, were smooth and dimensionally uniform, and had the high strength properties that are characteristic of the products of the invention.

Example 22

The effect of curing time and temperature was investigated, using bricks that had been prepared by mixing sandy clay soil (SLS) with 10% Binder C asphalt at 400 °F., cooling, screening through a 10-mesh screen, and compacting to a density of about 90% theoretical. The bricks were cured at 375° F., 400° F. and 425° F. for different times, and the compressive strengths were determined both dry and after soaking in water for seven days. The results are shown in Table XIX.

TABLE XIX.—EFFECT OF CURING TIME AND TEMPERATURE

[Bricks, SLS sandy clay + 10% Binder C percent theoretical density ~90%]

| Curing | | Compressive Strength, p.s.i. | |
|---|---|---|---|
| Temp., °F. | Time, Hours | Dry | Wet 7 Days |
| 375 | 8 | 3,060 | 2,710 |
|  | 16 | 4,715 | 3,620 |
|  | 32 | 7,220 | 5,680 |
| 400 | 8 | 3,430 | 3,130 |
|  | 16 | 5,780 | 5,140 |
|  | 32 | 8,035 | 5,830 |
|  | [1] (42) | 7,840 | 5,920 |
|  | [1] (65) | 8,220 | 5,000 |
| 425 | 4 | 2,540 | 2,275 |
|  | 8 | 4,370 | 3,625 |
|  | 16 | 6,680 | 4,310 |
|  | 32 | 7,900 | 5,250 |
|  | 65 | 8,170 | [2] 3,220 |
| No cure | ------ | 1,200 | 1,380 |

[1] 11.5% Asphalt. [2] 21 days.

It will be obvious from the data in Table XIX that high strength structures can be made from soil and asphalt using various combinations of curing time and temperature, in the ranges 375–425° F. and 4–65 hours, when a compacted density of about 90% is employed. There is also evidence that over-curing by heating longer than about 42 hours at 400° F. and at 425° F. results in decreased wet strength.

*Engineering and durability properties*

Data on the engineering and durability properties of soil-asphalt materials are given in Table XX, along with data on concrete blocks and fired clay brick for comparison. The figures in parentheses are compressive strengths, which serve as reference points for the samples tested. The experimental data reported on concrete blocks and fired clay brick were obtained on commercial products in common use in New Jersey.

It will be seen from Table XX that soil-asphalt building materials made according to the invention compare favorably with concrete and fired clay products, and are outstanding in several respects. In compressive strength the soil-asphalt materials equal or exceed that of concrete blocks and of fired clay brick. In tensile strength and flexural strength, the soil-asphalt materials are outstanding; for example, the flexural strength modulus of 1450 p.s.i. means that a 1″ thick panel of soil-asphalt would be self-supporting over a span of 14 feet. In an accelerated creep test using a loading of 1000 p.s.i., moderate (2200 p.s.i.) compressive strength products undergo a small amount of creep (0.001%/day). However, high (5770 p.s.i.) compressive strength products under a normal load of 100 p.s.i. undergo an initial deformation of about 0.006%, and thereafter show an extremely low rate of creep, the measured rate being zero for over 300 days. It should be noted that in some uses a small amount of creep is beneficial, in that a structure can then accommodate itself to an uneven foundation or to shifting forces.

TABLE XX.—PROPERTIES OF SOIL-ASPHALT BUILDING MATERIALS

[Figures in parentheses refer to dry compressive strength of sample]

| Property | Concrete Brick or Blocks | | | Fired Clay Brick | | | Soil-Asphalt Experimental |
|---|---|---|---|---|---|---|---|
|  | Experimental | Literature [a] | ASTM Specs. | Experimental | Literature | ASTM Specs. |  |
| Compressive Strength, p.s.i. | 1,910 | 1,000–9,000 [a] | 600–2,500 | 1,720–12,000 | 1,000–8,000 | 1,500–3,000 | 1,000–8,000. |
| Young's Modulus, p.s.i. |  |  |  |  |  |  | 1.4×10⁶ (4,350).[h] 6.5×10⁵ (6,010).[i] |
| Shear Strength, p.s.i. |  |  |  |  |  |  | 500 (5,500). |
| Tensile Strength, p.s.i. |  | 250 (3,000) [a] 400 (5,000) [a] 485 (3,000) [a] 675 (5,000) |  |  |  |  | 770 (4,360). |
| Flexural Strength Modulus, p.s.i. |  |  |  | 520 (1,720) | 600 (3,500) 1,200 (8,000) [g] |  | 1,450 (5,350). 2,170 (6,010). |
| Creep, Percent: |  |  |  |  |  |  |  |
| Ultimate, at 1,000 p.s.i. |  | 0.05 [a] |  |  |  |  |  |
| Per Day, at 1,000 p.s.i. |  |  |  |  |  |  | 0.001 (2,200).[b] |
| Per Day, at 100 p.s.i. |  |  |  |  |  |  | <0.0001 (5,770).[c] |
| Thermal Expansion, in./in./° F. |  | 5.5×10⁻⁶ [a] |  |  | 3.3×10⁻⁶ |  | 4.13×10⁻⁶. |
| Water Absorption: |  |  |  |  |  |  |  |
| 212° F., 5 Hours, Percent | 18 (1,910) |  |  | 13 (1,720) |  | 17–22 Max. | 7 (6,460). |
| Room Temp., 24 Hrs., Percent | 14 (1,910) |  | 15#/ft.³ max. | 10 (1,720) |  | 87–88% [f] | 0.34 (6,460). |
| Room Temp., 7 Days, Percent | 10 |  |  |  |  |  | 1.1 (5,780). |
| Percent Loss Compressive Strength | 48 |  |  | 0 (1,720) |  |  | 11 (5,140) wet. |
| Thermal Conductivity [d] |  | 12 [a] |  |  | 5 |  | 3.1–3.4. |
| Freeze-Thaw, 50 Cycles | Disinteg. (1,910). |  |  | Cracked |  | ([e]) | No disinteg. |
| Compressive Strength, Wet |  |  |  |  |  |  | 4,480 (6,460). |

[a] Sand-gravel-cement poured concrete.
[b] 100–200 days.
[c] 21–329 days.
[d] B.t.u./hr./ft.²/° F./in.
[e] No breakage, wt. loss 1–3% max.
[f] 78–88% of 212° F. absorption.
[g] Hard burned brick.
[h] Determined by sonic method.
[i] Calculated from flexure test data.

The thermal conductivity of soil-asphalt products made according to the invention is about 70% of that of fired clay bricks, and 30% of that of sand-gravel-cement concrete, indicating that less thermal insulation is required. The thermal expansion values reported in the table are preliminary, but it can be seen that they are in the same league as concrete and fired clay bricks.

In resistance to water, the soil-asphalt products are remarkable. The data in Table XX, obtained on half-brick size specimens, show that water absorption in 24 hours at room temperature was 0.34% compared to 10% for a common fired clay brick and 14% for a concrete block specimen. Soaking the soil-asphalt product in water for 7 days gave 1.4% absorption and caused an 11% loss in compressive strength from 5780 to 5140 p.s.i.; further soaking to as long as 70 days had little additional effect. In the 7-day test the common brick performed well, losing no strength, but the specimen of concrete block being tested absorbed 10% water and lost 48% in compressive strength.

Water absorption by building materials can be most serious in climates giving rise to alternate freezing-and-thawing. What happens is that adsorbed water freezes and opens up a crack by expansion, the crack absorbs more water during the following thaw period, and the crack then expands further during the next freeze period. In a freeze-thaw test simulating service conditions (comprising 16 hours of freezing to 0° F. and 8 hours of thawing, while submerged in water), specimens of concrete block show signs of deterioration in a few cycles, are badly damaged in 14 cycles, and are completely disintegrated in 50 cycles. In the same test, soil-asphalt bricks are markedly stable, showing practically no deterioration in 50 freeze-thaw cycles.

The effect of heat treatment on the binder, whereby it is converted into an oil-soluble bond, is shown by the following data. The binder of 9.1% asphalt was originally soluble completely in the powerful organic solvents carbon disulfide and carbon tetrachloride; but after the heat treatment, sufficient to give maximum compressive strength of 6265 p.s.i., only 0.2% was soluble in $CS_2$ and only 0.4% in $CCl_4$.

N.J. SANDY CLAY SOIL (SLS #4) AND 10% BINDER C (9.1% ASPHALT BASED ON TOTAL)

[Hot mixed 2 minutes at 390° F.; briquettes, 1.28″ x 3″ approx.; compacted at 4,700 p.s.i.]

| Curing | | Compressive Strength, p.s.i. | Percent Solubility | |
|---|---|---|---|---|
| Temp., °F. | Hours | | $CS_2$ | $CCl_4$ |
| Theoretical | | | 9.1 | 9.1 |
| Original hot mix | | | 8.6 | 8.4 |
| 300 | 24 | 930 | 8.1 | 7.8 |
| | 48 | 1,390 | 6.5 | 5.8 |
| 350 | 16 | 2,000 | 4.9 | 3.3 |
| | 48 | 4,490 | 1.7 | 1.6 |
| 400 | 8 | 3,790 | 2.5 | 4.2 |
| | 16 | 4,840 | 1.3 | 1.7 |
| | 24 | 5,350 | 0.5 | 0.3 |
| | 32 | 6,265 | 0.2 | 0.4 |

Surface coatings and cements adhere well to the products of the invention. For example, among those that have been found satisfactory are oil-based paints; water-based alkyd and latex paints; lacquers; metallic paints; solvent-based cements, e.g. Butons; non-solvent cements, e.g. epoxy cements; and mortars composed of various adhesives, e.g. epoxies, plus fillers such as sand and/or soil. These coatings and mortars require no priming. It is especially noteworthy that, as a result of the curing step employed in the process of the invention, there is no bleed-through which would impair the beauty or utility of surface coatings.

In summary, the present invention permits the production of materials having high strength, great durability, and other outstanding properties, by the process of combining a finely divided solid with from 3 to 30%, preferably 8 or 10 to 20% such as 8 to 12% of a binder, preferably asphalt, followed by compacting the resulting solid-binder mixture to within a critical density range, and then curing at prescribed conditions; the critical density range being 70–98%, for example 80–98%, preferably 80–95% and, most preferably, 85–95% of the theoretical density assuming no voids, and the curing conditions being from 2 or 4 to 80 hours, preferably 8 to 24 hours at a temperature in the range 300–500° F., preferably 350–450° F. and more preferably 350–425° F.; the compaction temperature being in the range 50–350° F., preferably 60–200° F.; the solid being preferably a soil containing 10–60%, e.g. 20–40% clay, and preferably containing less than 10%, particularly less than 5% of an expanding clay such as montmorillonite.

What is claimed is:

1. A process for preparing a structural element of high compressive and tensile strengths which comprises the steps:
   (a) intimately mixing a substantially dry finely divided soil containing less than about 5% moisture with a bituminous binder, said bituminous binder being present in the resulting admixture in an amount in the range of about 3 to 30 wt. percent based on said soil;
   (b) compacting said admixture to about 90 to 98% of its theoretical density; and
   (c) curing the compacted admixture in air at a temperature in the range of about 250° F. to 500° F. for a period of time in the range of from about 1 to 80 hours.

2. A process as defined by claim 1 wherein said substantially dry finely divided soil contains less than about 1% moisture.

3. A process as defined by claim 1 wherein said bituminous binder is asphalt.

4. A process as defined by claim 1 wherein the amount of bituminous binder in said resulting admixture is in the range of from about 8 to 12 wt. percent.

5. A process as defined by claim 1 wherein said admixture is cured at a temperature in the range of about 350° F. to 450° F. for about 8 to 24 hours.

6. A process as defined by claim 1 wherein step (a) the temperature is in the range from 200° F. to 450° F.

7. A process for preparing a structural element of high compressive and tensile strengths which comprises the steps:
   (a) intimately mixing a substantially dry finely divided soil containing less than about 5% moisture with a bituminous binder, said bituminous binder being present in the resulting admixture in an amount in the range of about 3 to 30 wt. percent based on said soil, said resulting admixture containing about 0.4 to 4 wt. percent hydrocarbon asphaltic solvent having a boiling point less than 400° F.;
   (b) compacting said admixture to about 80 to 95 wt. percent of its theoretical density; and
   (c) curing the compacted admixture in air at a temperature in the range of about 250° F. to 500° F. for a period of time in the range of from about 1 to 80 hours.

References Cited by the Examiner

UNITED STATES PATENTS

| | | | |
|---|---|---|---|
| 1,007,832 | 11/1911 | Whitney | 106—281 |
| 1,894,630 | 1/1933 | Newberger | 106—280 |
| 2,444,413 | 7/1948 | Weston | 117—100 XR |
| 2,572,068 | 10/1951 | Sommer | 264—29 XR |
| 2,583,292 | 1/1952 | Bowen et al. | 117—100 XR |
| 2,626,872 | 1/1953 | Miscall | 106—122 |
| 2,774,383 | 12/1956 | Kidd | 117—100 XR |
| 2,917,305 | 12/1959 | Csanyi | 106—283 XR |
| 3,018,840 | 11/1961 | Goff | 117—100 XR |
| 3,021,566 | 2/1962 | Sommer | 117—100 XR |
| 3,168,602 | 2/1965 | Davies et al. | 264—29 XR |

ROBERT F. WHITE, *Primary Examiner.*

J. A. FINLAYSON, *Assistant Examiner.*